(12) United States Patent
Swider et al.

(10) Patent No.: US 10,977,437 B2
(45) Date of Patent: Apr. 13, 2021

(54) TECHNOLOGIES FOR AUTOMATICALLY GENERATING PRODUCT DESIGNS BASED ON LINKED INFORMATION

(71) Applicant: CIMPRESS SCHWEIZ GMBH, Winterthur (CH)

(72) Inventors: Nicholas Richard Swider, Waltham, MA (US); Edward James Hammond, Waltham, MA (US); Christina Kayastha, Cambridge, MA (US); Christopher Wai-Lung Kwan, Newton, MA (US); Brian Robert Chitester, Jamaica Plain, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 169 days.

(21) Appl. No.: 16/172,424

(22) Filed: Oct. 26, 2018

(65) Prior Publication Data
US 2020/0134008 A1 Apr. 30, 2020

(51) Int. Cl.
*G06F 17/00* (2019.01)
*G06F 40/186* (2020.01)
*G06T 11/60* (2006.01)
*G06F 40/174* (2020.01)

(52) U.S. Cl.
CPC .......... *G06F 40/186* (2020.01); *G06F 40/174* (2020.01); *G06T 11/60* (2013.01)

(58) Field of Classification Search
CPC ....... G06F 40/186; G06F 40/174; G06T 11/20
USPC ........................................................ 715/243
See application file for complete search history.

(56) References Cited

U.S. PATENT DOCUMENTS

| | | | | |
|---|---|---|---|---|
| 7,619,638 B2* | 11/2009 | Walker, Jr. | ............... | G06T 11/00 345/629 |
| 9,690,549 B2* | 6/2017 | Zaiwei | ..................... | G06F 3/033 |
| 2005/0075746 A1* | 4/2005 | Malone | ................ | H04N 1/3871 700/97 |
| 2005/0122543 A1* | 6/2005 | Walker | ................... | H04N 1/622 358/1.18 |
| 2008/0267505 A1* | 10/2008 | Dabet | .................... | G06F 40/174 382/181 |
| 2009/0119581 A1* | 5/2009 | Velusamy | ............. | G06F 40/274 715/256 |
| 2010/0211885 A1* | 8/2010 | Berg | ..................... | G06F 40/186 715/745 |
| 2010/0312549 A1* | 12/2010 | Akuwudike | .......... | G06F 16/367 704/9 |
| 2012/0304052 A1* | 11/2012 | Tanaka | .................... | G06T 11/60 715/243 |

(Continued)

OTHER PUBLICATIONS

Alsofyani et al., Design and Development of TPACK Template, IEEE 2011, pp. 310-313. (Year: 2011).*

*Primary Examiner* — Cong-Lac Huynh
(74) *Attorney, Agent, or Firm* — Marshall, Gerstein & Borun LLP

(57) ABSTRACT

Systems and methods for automatically generating product designs using linked information. According to certain aspects, an electronic device may present a template associated with one or more products. The electronic device may facilitate a search for a desired entity having an associated entity design element, and modify the template by incorporating the associated entity design element. A user may select different functionalities associated with the modified template, including selecting to place a product order.

20 Claims, 16 Drawing Sheets

(56) References Cited

U.S. PATENT DOCUMENTS

| | | | |
|---|---|---|---|
| 2014/0059058 A1* | 2/2014 | Ohtsuki | G06F 16/13 |
| | | | 707/750 |
| 2018/0020076 A1 | 1/2018 | Porwal | |
| 2019/0311407 A1* | 10/2019 | Li | G06Q 30/0275 |
| 2019/0340305 A1* | 11/2019 | Amir | G06K 9/00677 |

* cited by examiner

TECHNOLOGIES FOR AUTOMATICALLY GENERATING PRODUCT DESIGNS BASED ON LINKED INFORMATION

FIELD

The present disclosure is directed to improvements in product design using electronic devices. More particularly, the present disclosure is directed to platforms and technologies to automatically generate product designs using design elements determined from linked information.

BACKGROUND

Individuals or customers frequently purchase or order products or items for certain applications or uses. For example, an individual may order customized printed products such as brochures and business cards associated with a business. Conventionally, individuals may use online design studios to customize the designs to be applied to certain products. These online design studios typically utilize predefined templates having certain design elements positioned at or arranged in default locations in the templates.

In some cases, individuals may desire to customize templates to suit the individuals' purpose. For example, a small business owner may wish to customize a specific template for a business card for their business. However, customizing templates is often tedious and inefficient. In particular, individuals must manually replace template elements with desired elements (e.g., logos, images, text, etc.). Additionally, individuals may want to modify colors, backgrounds, and the like to improve the overall aesthetic of the design.

Accordingly, there is an opportunity for platforms and techniques to automatically generate product designs from templates to conform with desired elements and aesthetics.

SUMMARY

In an embodiment, a computer-implemented method of automatically generating designs for a product is provided. The method may include: displaying, in a user interface, a template for the product, the template having a text field and a design element for display on the product; receiving, by a computer processor via the user interface, an input string for the text field; modifying, by the computer processor, the template displayed in the user interface by filling in the text field with the input string; interfacing with a data source to identify, by the computer processor, an entity based on the text field and if the entity is identified, then retrieving an entity design element associated with the entity from the data source; and modifying the template displayed in the user interface by replacing the design element with the entity design element.

In another embodiment, a system for automatically generating designs for a product is provided. The system may include a user interface for displaying a template for the product, the template having a text field and a design element for display on the product; a memory storing non-transitory computer executable instructions; and a computer processor interfacing with the user interface and the memory. The computer processor may be configured to execute the non-transitory computer executable instructions to: cause the processor to: receive an input string for the text field; modify the template displayed in the user interface by filling in the text field with the input string; interface with a data source to identify an entity based on the text field and if the entity is identified, retrieve an entity design element associated with the entity from the data source; and modify the template displayed in the user interface by replacing the design element with the entity design element.

In a further embodiment, a non-transitory computer-readable storage medium configured to store instructions is provided. The instructions when executed by a processor may cause the processor to perform operations comprising: displaying, in a user interface, a template for the product, the template having a text field and a design element for display on the product; receiving via the user interface, an input string for the text field; modifying the template displayed in the user interface by filling in the text field with the input string; interfacing with a data source to identify an entity based on the text field and if the entity is identified, then retrieving an entity design element associated with the entity from the data source; and modifying the template displayed in the user interface by replacing the design element with the entity design element.

BRIEF DESCRIPTION OF THE FIGURES

FIGS. 6A-6C depict example templates and example product designs generated using search queries and according to the example templates, in accordance with some embodiments.

FIGS. 7A-7D depict example templates and example product designs generated using data source information and according to the example templates, in accordance with some embodiments.

DETAILED DESCRIPTION

Figure 1A:
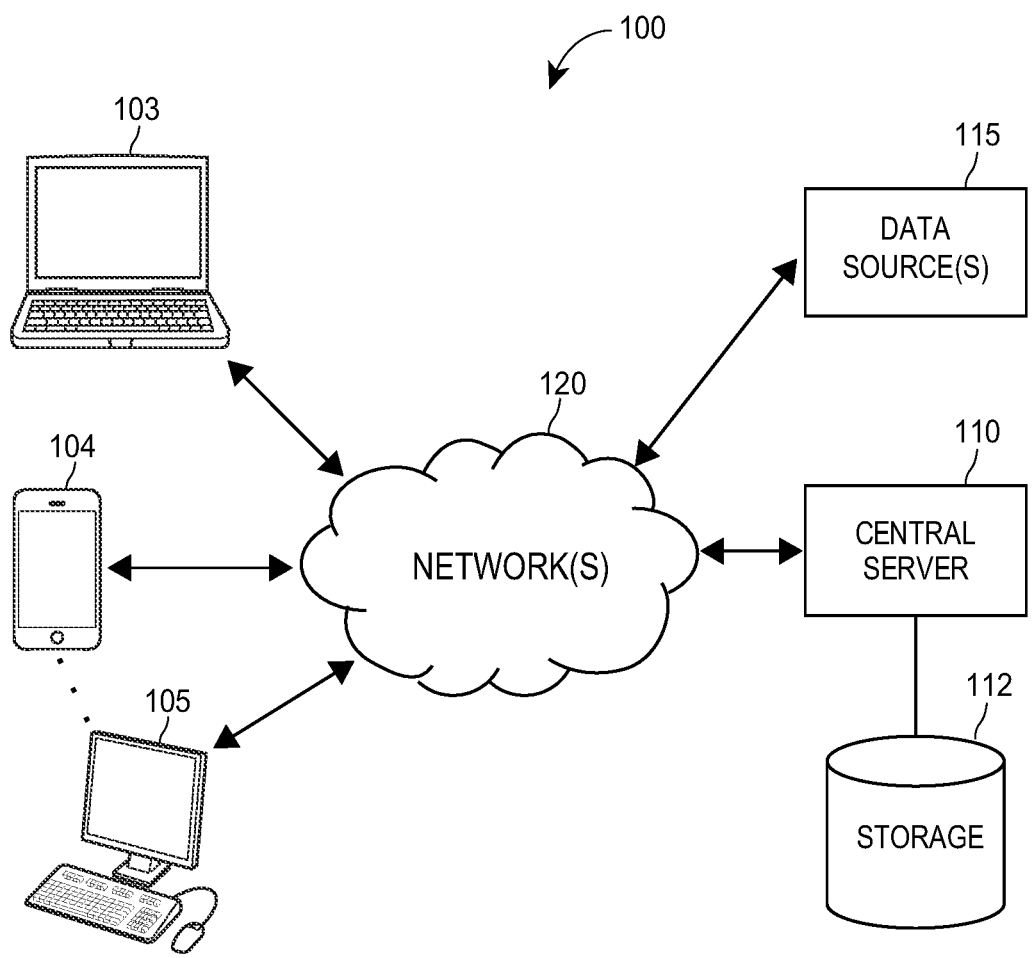
FIG. 1A depicts an overview of components and entities associated with the systems and methods, in accordance with some embodiments.

The present embodiments may relate to, inter alia, platforms and technologies for dynamically generating product designs based on templates and containing various graphical and/or textual content. According to certain aspects, an individual or customer may use an electronic device to input a query (e.g., an input string) containing terms desired for a product design, and the electronic device may facilitate generation of one or more product designs according to the query and based on one or more established templates. For example, the electronic device may modify a text field included in a template by filling in the text field with the terms contained in the query.

The systems and methods may further determine an entity design element based on the modified text field, where the entity design element may be graphical content (e.g., images and logos) or textual content (e.g., name, slogan, address, phone number, e-mail address, website) associated with an entity. The entity may be a corporation, company, partnership, retailer, wholesaler operating on behalf of another entity (e.g., a white label wholesaler), or other suitable business or organization. In an implementation, the systems and methods may interface with one or more data sources to request for and identify or determine the entity design element based on the modified text field. Particularly, by communicating (e.g., pinging) the one or more data sources via an application programming interface (API) or other suitable interface in real-time, the systems and methods may continuously update the request to reflect the text field as modified in the template at any given time. Upon identifying the entity design element, the systems and methods described herein may display or otherwise suggest the entity design element to the user, enabling the user to select and apply the entity design element to the template.

In embodiments, an individual may input other design elements (e.g., graphical or textual content unrelated to the entity) to add to the product designs. The systems and methods may further determine how to modify or align the entity design element and other design elements according to the templates and/or based on other factors. In one scenario, the systems and methods may determine a dominant color or color scheme from the entity design element (e.g., an image depicting a logo of the entity), and apply that dominant color or color scheme to the template. Additional modifications and alignments are envisioned. The terms "components," "elements," and "design elements" may be used interchangeably throughout this description. Similarly, the terms "individual," "customer," and "user" may be used interchangeably throughout this description.

The systems and methods therefore offer numerous benefits. The dynamic product design generation results in the ability for customers to review and select from multiple design options, where the customers may experience greater flexibility and ease, and less frustration, in designing custom products. Unlike conventional design studios that merely use an input query to modify a text field of a template, the systems and methods described herein utilize the text field, as it is being updated by the input query in real-time, to automatically search and identify an entity design element from a data source. The entity design element may not only be used to modify a text field of a template, but may also be used to modify a design element (e.g., image) of the template, a color scheme of the template, or any other suitable graphical content. Additionally, the systems and methods generate product designs that have aesthetically-pleasing and consistent elements, resulting from an analysis of one or more design elements or entity design elements included in the product designs. Moreover, companies or entities that offer physical items for sale based on the product designs may experience increased sales. It should be appreciated that additional benefits are envisioned.

The systems and methods discussed herein address a challenge that is particular to e-commerce. In particular, the challenge relates to a difficulty in accurately and effectively creating and modifying digital designs of physical products. Conventionally, a user manually designs a product by manually manipulating elements of the design. Alternatively, the user must create a design by modifying previously-designed templates. However, these conventional methods are often time consuming, ineffective, and/or expensive. The systems and methods offer improved capabilities to solve these problems by dynamically and automatically generating product designs according to search queries, interfacing with data sources, and using existing templates. Further, because the systems and methods employ communication between and among multiple devices, the systems and methods are necessarily rooted in computer technology in order to overcome the noted shortcomings that specifically arise in the realm of e-commerce.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105, each of which may be operable by a user (not shown in FIG. 1A). The user(s) may be any individual or person who may be interested in purchasing items, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104, 105) and optionally a set of brick-and-mortar retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a central server 110 via one or more networks 120. The central server 110 may be associated with the entity that owns and/or manages the e-commerce platform(s) and/or the set of brick-and-mortar retail stores. In particular, the central server 110 may include or support a web server configured to host a website that offers various products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of designs, as well as information associated with the designs, including properties of the elements/components of the designs.

The system 100 may further include a set of data sources 115, where the central server 110 and/or the electronic devices 103, 104, 105 may interface with and retrieve information from the set of data sources 115 via the network(s) 120. The data source(s) 115 may be implemented as storage or as a platform including various hardware and software components. In particular, one of the data sources 115 may be a multimedia database or any suitable memory device that stores graphical content such as images, videos, icons, stylized text, and/or the like, and another of the data sources 115 may be a social networking service that may at least partially store data associated with users or entities registered with the social networking service. For example, if a business is registered or otherwise has an account with the social networking service, the social networking service may store the following information associated with the business: owner/proprietor, address, logo(s), phone number, color scheme, and/or other information that identifies or describes the business. It should be appreciated that alternative and additional data sources, platforms, and/or the like are envisioned.

Although three (3) electronic devices 103, 104, 105, one (1) server 110, and one (1) data source 115 are depicted in FIG. 1A, it should be appreciated that greater or fewer amounts are envisioned. For example, there may be multiple central servers and/or multiple data sources, each one associated with a different entity.

Figure 1B:
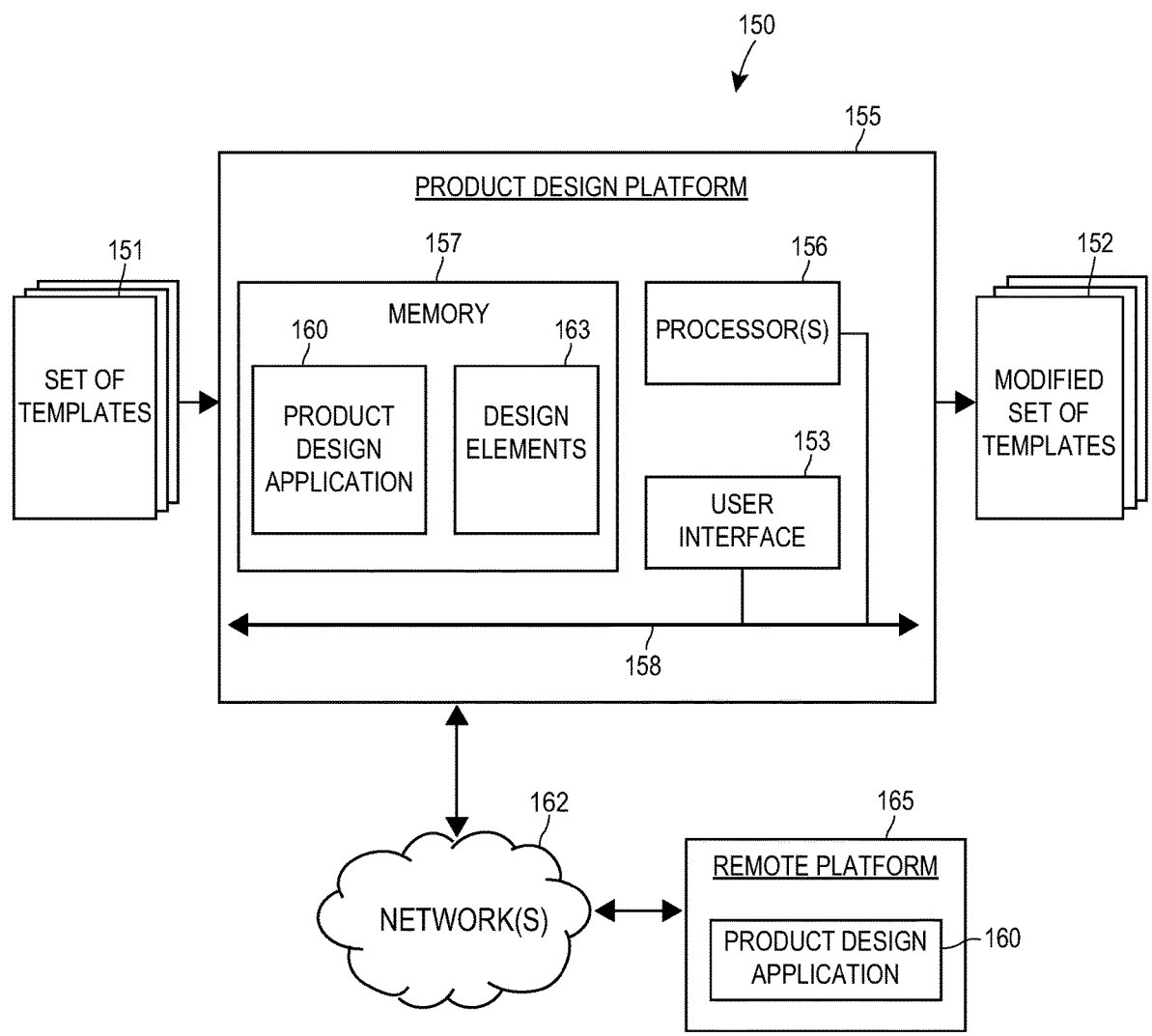
FIG. 1B depicts an overview of certain components configured to facilitate the systems and methods, in accordance with some embodiments.

According to embodiments, the user(s) may use the electronic devices 103, 104, 105 to facilitate the design of products based on a template, such as in contemplation of placing an order for a product(s). The template may include a text field and a design element for display on the product, each of which has a characteristic or property (e.g., as defined by metadata). The user(s) may use the electronic devices 103, 104, 105 to input a text string, from which the electronic devices 103, 104, 105 and/or the central server 110 may facilitate generation of the product design(s) by modifying the template to edit, add, or replace the text field and the design element that conform to or are associated with the intended use of the product(s). Particularly, the text field of the template may be filled in or otherwise modified with the text string inputted by the user. In order to modify the design element, the electronic devices 103, 104, 105 and/or the central server 110 may interface with a data source 115 to identify an entity based on the filled in text field. If the entity is identified, the electronic devices 103, 104, 105 and/or the central server 110 may retrieve an entity design element associated with the entity from the data source 115 and replace the design element with the entity design element. The user(s) may then use the electronic devices 103, 104, 105 to review the product design(s) and/or facilitate an order(s) for the product(s) according to any selected product design(s). FIG. 1B depicts more specific components associated with the systems and methods.

FIG. 1B depicts an example environment 150 in which a template 151 is processed into a modified template 152 via a product design platform 155, according to embodiments. The product design platform 155 may be implemented on any computing device, including one or more of the electronic devices 103, 104, 105, or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The product design platform 155 may further include a user interface 153 configured to present content (e.g., designs and components/elements thereof). Additionally, a user may make selections to the content via the user interface 153, such as to view or modify designs (or design elements thereof) presented thereon, input queries, and/or make other selections. The user interface 153 may be embodied as part of a touchscreen configured to sense touch interactions and gestures by the user, or otherwise a display configured to present content. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a product design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The product design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105, or the server 110 as discussed with respect to FIG. 1A, and may include many or all of the elements described above with respect to the platform 155. In some embodiments, as will be described herein, the product design application 160 as will be further described herein may be stored and executed by the remote platform 165 instead of by or in addition to the platform 155.

According to embodiments, the product design platform 155 (and more particularly, the product design application 160) may process or modify the template 151 to produce the modified template 152. As used herein, a "modified template" may also be referred to as a "product design." It should also be understood that the example environment 150 may be configured to process or modify multiple templates 151 to generate multiple modified templates 152. The original template 151 and the modified template 152 may be embodied as any type of electronic document, file, template, etc., that may include a text field for displaying textual content and a design element for displaying visual content and/or textual content.

The memory 157 may store design elements 163 accessible to the product design application 160. Design elements 163 may include default design elements that are originally included in template 151 and/or entity design elements retrieved from the data source 115. According to embodiments, the product design application 160 may process the template 151 by modifying, deleting, inserting, and/or replacing the text field and the default design element included in the template 151 with the input string and entity design element, respectively. Each of the text field and design elements 163 included in templates 151, 152 may have associated metadata that may define how the corresponding text field and design elements 163 are to be presented within the templates 151, 152. Additionally, the product design application 160 may determine how to visually depict the text field and design elements 163 according to the metadata. In embodiments, the templates 151, 152, elements thereof (i.e., the text field, design elements 163), and the metadata thereof may be implemented using any type of file format. For example, the metadata may be in JavaScript Object Notation (JSON) format, or another format(s).

The user may input a text string (e.g., via alphanumeric input, voice input, etc.) via the user interface 153, which may cause the product design application 160 to modify a text field of the template 151 and to retrieve certain entity design elements based on the text string or the modified text field, and generate the modified template 152. The product design application 160 may cause the modified template 152 and elements thereof to be displayed on the user interface 153 for review by the user. In embodiments, the templates 151, 152 may be stored in memory as program data in a hard disk drive, magnetic disk and/or optical disk drive in the product design platform 155 and/or the remote platform 165. The design processing and modification techniques discussed herein are illustrated in certain of the following figures.

Figure 2:
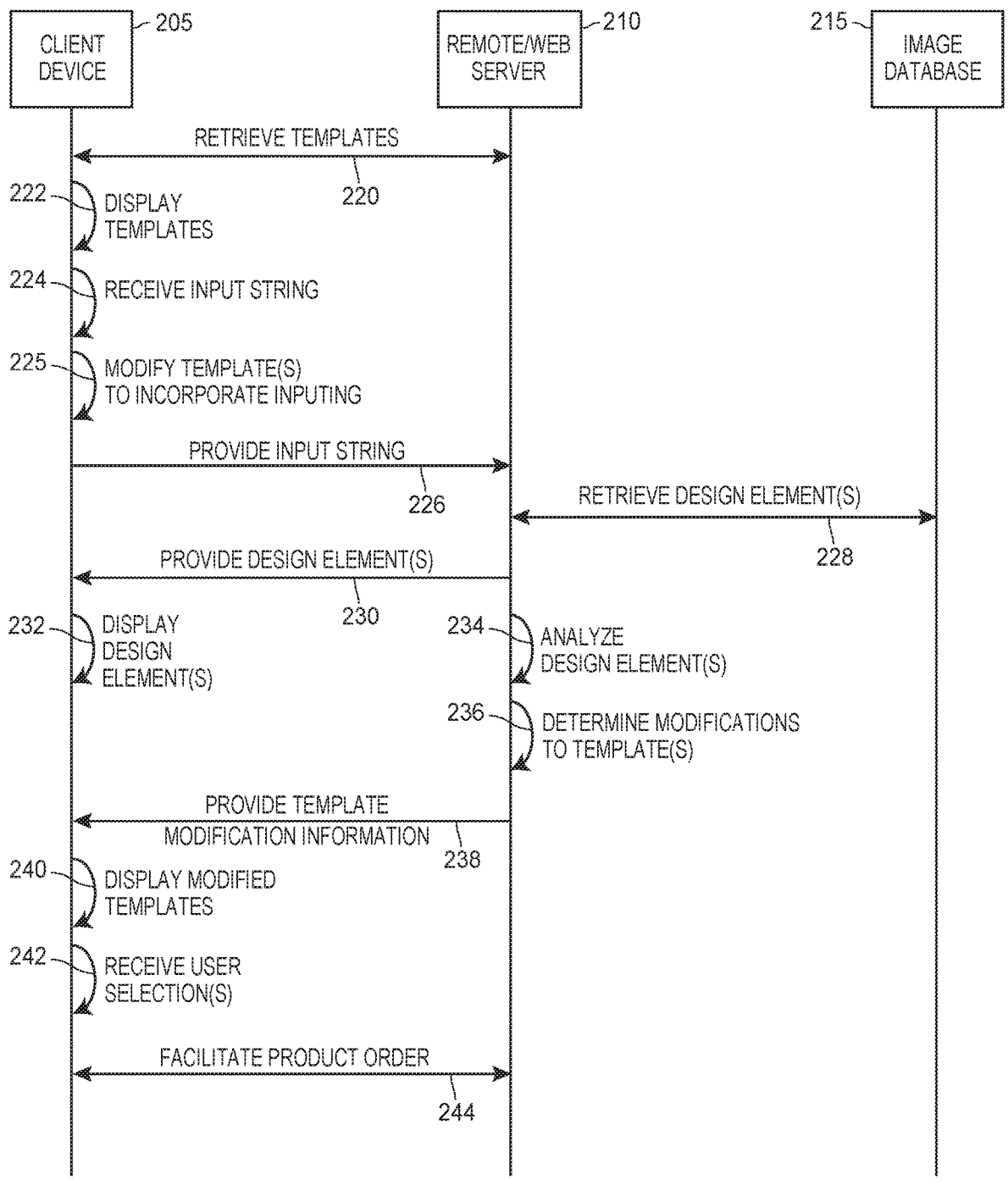
FIG. 2 is a signal diagram associated with automatically generating product designs using design elements determined from a text string, in accordance with some embodiments.

FIG. 2 depicts a signal diagram 200 associated with automatically modifying templates of product designs. The signal diagram 200 includes a client device 205 (such as one of the electronic devices 103, 104, 105 as discussed with respect to FIG. 1A), a remote/web server 210 (such as the central server 110 as discussed with respect to FIG. 1A), and an image database 215 (such as one of the data source(s) 115 as discussed with respect to FIG. 1A). According to embodiments, the server 210 may support a website (e.g., a product design website) or an application that is accessible by the client device 205 via a network connection, where a user of the client device 205 may use the client device 205 to make selections associated with the website. Further, the image database 215 may be any multimedia database configured to store various digital images, videos, textual content, and/or other content.

The server 210 may connect to and interface with the image database 215 via an application programming interface (API) or other interface. In an implementation, the image database 215 may be embodied within or separate from the server 210. For example, the image database 215 may be part of a remote server that may connect to the server 210 via a network connection. The image database 215 may store protected and/or public domain digital images and/or design elements, where the digital images and/or design elements may be sorted, classified, categorized, and/or the like. It should be appreciated that the server 210 may interface with multiple image databases 215.

It should be appreciated that the functionalities performed by the various components are exemplary, and that additional or alternative functionalities are envisioned. Further, although FIG. 2 depicts certain functionalities being performed by certain of the components, it should be appreciated that another of the components may perform the certain functionalities. For example, some of the analysis and determination functionalities as depicted as being performed by the server 210 may additionally or alternatively be performed by the client device 205 (e.g., by an application executing on the client device 205).

The signal diagram 200 may begin when the client device 205 retrieves (220), from the server 210, a template. In embodiments, the client device 205 may access the website supported by the server 210, and a user of the client device 205 may use the client device 205 to make certain selections associated with retrieving the template. For example, the user may select to view a template associated with a restaurant business (i.e., a category of templates). As another example, a default template may be retrieved from the server 210. It should be appreciated that different templates may be associated with different businesses, uses, products, categories, and/or the like, where the website may organize or categorize the templates accordingly.

After retrieving the template, the client device 205 may display (222) the template for review by the user. In embodiments, the user may use the client device 205 to make certain selections associated with the template, such as to view certain details of the template, zoom in or out, and view different angles or sides of the template. As mentioned above, the template may include a text field and a default design element. In particular, the text field may store textual content for a product, and the default design element may be a background image or pattern, a stock image, a design, a motif, a logo, or any other suitable digital representation.

The client device 205 may receive (224), via a user interface of the client device 205, an input string that may be associated with a modification or redesign of the template. In embodiments, the input string may be associated with a desired modification to the template. In particular, the input string may be a text string that the user may wish to include in the product design. For example, a user may input an address, a phone number, and a name as textual content. A user may input the text string via an appropriate interface(s) of the website, and may use various input channels or techniques (e.g., voice input, mouse/keyboard input, predictive terms, etc.). It should be appreciated that the client device 205 may receive, via the user interface, various amounts of text strings. The client device 205 may then modify (225) the template displayed in the user interface by filling in the text field of the template with the input string.

The client device 205 may provide (226) the input string to the server 210 via the network connection, such as in response to the client device 205 receiving, via the user interface, the input string, or in response to filling in the text field of the template with the input string. The server 210 may retrieve (228), from the image database 215, a design element(s) according to the input string or filled in text field. In particular, the server 210 may query (e.g., via an API) the image database 215 for design element(s) that may be representative of the input string or filled in text field. For example, if the input string includes the terms "florist" and "orchid," a representative design element may depict an image of a flower or a motif of an orchid. It should be appreciated that various representative design elements may be retrieved from the image database 215.

The server 210 may provide (230) the design element(s) to the client device 205. After receipt, the client device 205 may display (232) the design element(s) for review by the user of the client device 205. According to embodiments, the user may use the client device 205 to make certain selections associated with the design element(s), such as "favoriting" or removing design element(s), viewing additional details associated with the design element(s), facilitating an additional search for additional design element(s) based on the same or additional input string term(s), and or other functionalities. Alternatively, or in addition, the server 210 may modify (234) the template by replacing the default design element of the template with the design element retrieved from the image database 215. For example, the server 210 may replace a stock background image with an image of a flower or a motif of an orchid.

In some embodiments, the server 210 (or in some cases, an application executing on the client device 205) may analyze (234) the design element to determine a color scheme, such as a dominant or prominent color, that exists in or is otherwise associated with the design element (and optionally determine a color palette from the design element, where the color palette may include two or more prominent colors). As used herein, a dominant color of the design element is the color (or color shade) that is most prominent in the design element, where the server 210 may determine the dominant color (or color palette) using various techniques, calculations, or by interfacing with a third party service. Such analysis of the design element may include determining various metrics associated with the design element, such as contrast level, brightness, hue, saturation, intensity, RGB color makeup, and/or others. It should be appreciated that other image analysis techniques and calculations are envisioned.

Upon determining the color scheme, the server 210 (or in some cases, an application executing on the client device 205) may modify (236) the template, such as at least in part by incorporating the color scheme into the template.

The server 210 may provide (238) information associated with modification of the template to the client device 205. After receiving the information, the client device 205 may display (240) the template according to the received modification information. In particular, the client device 205 may display, for each template, the text field populated with the input string and the default design element replaced with the design element retrieved from the image database 215.

The client device 205 may further receive (242) a user selection associated with the displayed template. For example, the website or application may support a user ordering products according to the displayed template, where the user may select the finished template from which to order a product, a desired size and quantity of the product, shipping and payment information, and/or other selections. The client device 205 may further facilitate (244) a product order with the server 210. In particular, the client device 205 may transmit selections associated with the product order to the server 210, and the server 210 may facilitate an order of the product according to the selections.

Figure 3:
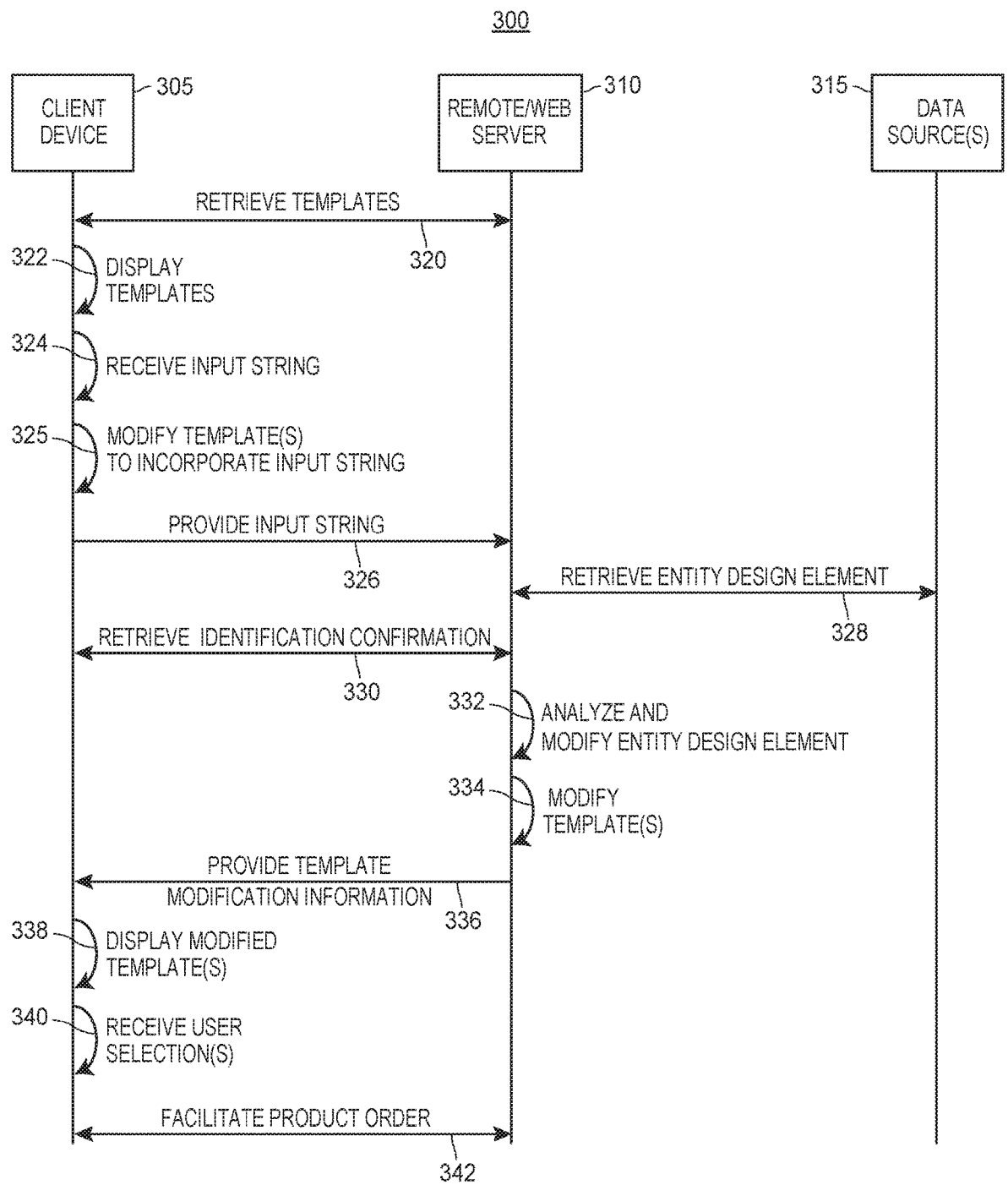
FIG. 3 is a signal diagram associated with automatically generating product designs using an entity design element determined from interfacing with a data source, in accordance with some embodiments.

FIG. 3 depicts a signal diagram 300 associated with automatically modifying templates of product designs. The signal diagram 300 includes a client device 305 (such as one of the devices 103, 104, 105 as discussed with respect to FIG. 1A), a remote/web server 310 (such as the central server 110 as discussed with respect to FIG. 1A), and a data source(s) 315 (such as the data source(s) 115 as discussed as discussed with respect to FIG. 1A). According to embodiments, the server 310 may support a website (e.g., a product design website) or an application that is accessible by the client device 305 via a network connection, where a user of the client device 305 may use the client device 305 to make selections associated with the website.

The server 310 may connect to and interface with the data source(s) 315 via an application programming interface (API) or other interface. In an implementation, the data source(s) 315 may be embodied within or separate from the server 310. For example, the data source(s) 315 may be part of a social networking service or social media device (e.g., social networking database) that may connect to the server 310 via a network connection. According to embodiments, users and entities may have accounts associated with the data source(s) 315 (e.g., a business may have an account and profile with a social networking service or social media device).

It should be appreciated that the functionalities performed by the various components are exemplary, and that additional or alternative functionalities are envisioned. Further, although FIG. 3 depicts certain functionalities being performed by certain of the components, it should be appreciated that another of the components may perform the certain functionalities. For example, some of the analysis and determination functionalities as depicted as being performed by the server 310 may additionally or alternatively be performed by the client device 305 (e.g., by an application executing on the client device 305).

The signal diagram 300 may begin when the client device 305 retrieves (320), from the server 310, a template. In embodiments, the client device 305 may access the website supported by the server 310, and a user of the client device 305 may use the client device 305 to make certain selections associated with retrieving the template. For example, the user may select to view a template associated with a restaurant business (i.e., a category of templates). As another example, a default template may be retrieved from the server 310. It should be appreciated that different templates may be associated with different businesses, uses, products, categories, and/or the like, where the website may organize or categorize the templates accordingly.

After retrieving the template, the client device 305 may display (322) the template for review by the user. In embodiments, the user may use the client device 305 to make certain selections associated with the template, such as to view certain details of the template, zoom in or out, and view different angles or sides of the template. As mentioned above, the template may include a text field and a default design element. In particular, the text field may store textual content for a product, and the default design element may be a background image or pattern, a stock image, a design, a motif, a logo, or any other suitable digital representation.

The client device 305 may receive (324), via a user interface of the client device 305, an input string that may be associated with a modification or redesign of the template. In embodiments, the input string may be associated with an entity such as an individual, corporation, business, retailer, and/or the like, the subject of which the user may wish to create a product. For example, the user may input the string "Fiona's Florist" to match a business having the same name. The input string may contain other content that the user may wish to include in the product design. For example, a user may input their name to be included on a business card for "Fiona's Florist." A user may input the string via an appropriate interface(s) of the website, and may use various input channels or techniques (e.g., voice input, mouse/keyboard input, predictive terms, etc.). It should be appreciated that the client device 305 may receive, via the user interface, various amounts of input strings. The client device 305 may then modify (325) the template displayed in the user interface by filling in the text field of the template with the input string.

The client device 305 may provide (326) the input string to the server 310 via the network connection, such as in response to the client device 305 receiving, via the user interface, the input string, or in response to filling in the text field of the template with the input string. The server 310 may retrieve (328), from the data source(s) 315, an entity design element, which may contain visual and/or textual content, according to at least the input string or filled in text field. To do so, the server 310 may query (e.g., via an API) the data source(s) with the input string or filled in text field to identify or determine a profile or account that matches the query, where the profile or account may include textual content such as phone number, address, contact name(s), email address, and/or the like, and/or visual content such as images, logos, motifs, color(s), and/or the like. For example, the data source(s) 315 may be associated with a social networking service, and there may be a profile or account for a business with the name "Fiona's Florist," where the profile may include a phone number, address, and logo. It should be appreciated that various amounts of representative visual and/or textual content may be retrieved from the source(s) 315.

The server 310 may retrieve (330) an identification confirmation from the client device 305. In particular, the server 310 may provide a plurality of entity design elements retrieved in (328) to the client device 305 for review by the user. In certain scenarios, the server 310 may provide entity design elements associated with multiple profiles or accounts that match the input string. The user may use the client device 305 to confirm or select a desired profile or account, which the client device 305 may relay to the server 310. According to embodiments, the user may also use the client device 305 to make certain selections associated with the entity design elements, such as "favoriting" or removing certain entity design elements, viewing additional details associated with certain entity design elements, facilitating an additional query for additional entity design elements based on the same or additional input string or filled in text field, and or other functionalities.

In some embodiments, the server 310 (or in some cases, an application executing on the client device 305) may analyze and optionally modify (332) the entity design element. In an embodiment, the server 310 may analyze the entity design element to determine a color scheme, such as a dominant or prominent color that exists in or is otherwise associated with the entity design element (and optionally determine a color palette from the entity design element, where the color palette may include two or more prominent colors). As used herein, a dominant color of the entity design element is the color (or color shade) that is most prominent in the entity design element, where the server 310 may determine the dominant color (or color palette) using various techniques, calculations, or by interfacing with a third party service.

Such analysis of the entity design element may include determining various metrics associated with the entity design element, such as contrast level, brightness, hue, saturation, intensity, RGB color makeup, and/or others. It should be appreciated that other image analysis techniques and calculations are envisioned.

Upon determining the color scheme, the server 310 (or in some cases, an application executing on the client device 305) may modify (334) at least a portion of the template according to the analysis and optional modification of (332). In some embodiments in which the server 310 may process or modify multiple templates 151 to produce multiple modified templates 152, the server 310 may determine which templates among the multiple templates 151 to modify based on a category of the selected profile or account. For example, if the selected profile or account is associated with a painting business, the server 310 may determine to display and modify templates that match a painting category.

In modifying at least the portion of the template(s), the server may modify certain default elements with the entity design element associated with the selected profile or account retrieved from the data source(s) 315. For example, the server 310 may replace a stock background image with a logo associated with the selected profile or account of a painting business. An additional of the modifications of the template may be to apply the determined dominant color of the retrieved entity design element (e.g., as a hue) to at least a portion of the template. For example, if the dominant color of a profile image of a painting business is blue, then the server 310 may apply a blue hue to the template.

The server 310 may provide (336) information associated with modification of the template to the client device 305. After receiving the information, the client device 305 may display (338) the template according to the received modification information. In particular, the client device 305 may display, for each template, the text field populated with the input string and the default design element replaced with the entity design element retrieved in (328). For example, if the entity design element retrieved from the data source(s) 315 is an entity text string, the client device 305 may display the entity text string in place of the default design element of the template. As another example, if the entity design element retrieved from the data source(s) 315 is an entity color scheme (e.g., a scheme having a dominant color or hue), the client device 305 may replace a default color scheme of the template with the entity color scheme.

The client device 305 may further receive (340) a user selection associated with the displayed template. For example, the website or application may support a user ordering products according to the displayed template, where the user may select the finished template from which to order a product, a desired size and quantity of the product, shipping and payment information, and/or other selections. The client device 305 may further facilitate (342) a product order with the server 310. In particular, the client device 305 may transmit selections associated with the product order to the server 310, and the server 310 may facilitate an order of the product according to the selections.

FIGS. 4A-4D depict example templates and/or designs for a product, and design elements thereof. It should be appreciated that the templates, designs, and design elements thereof are merely exemplary and that alternative and additional templates, designs, and design elements are envisioned. Further, although the templates and designs of FIGS. 4A-4D as depicted may be associated with business cards, other alternative and additional products are envisioned. In embodiments, the templates, designs, and design elements may be displayable in a user interface of an electronic device.

Figures 4A, 4B, 4C, 4D:
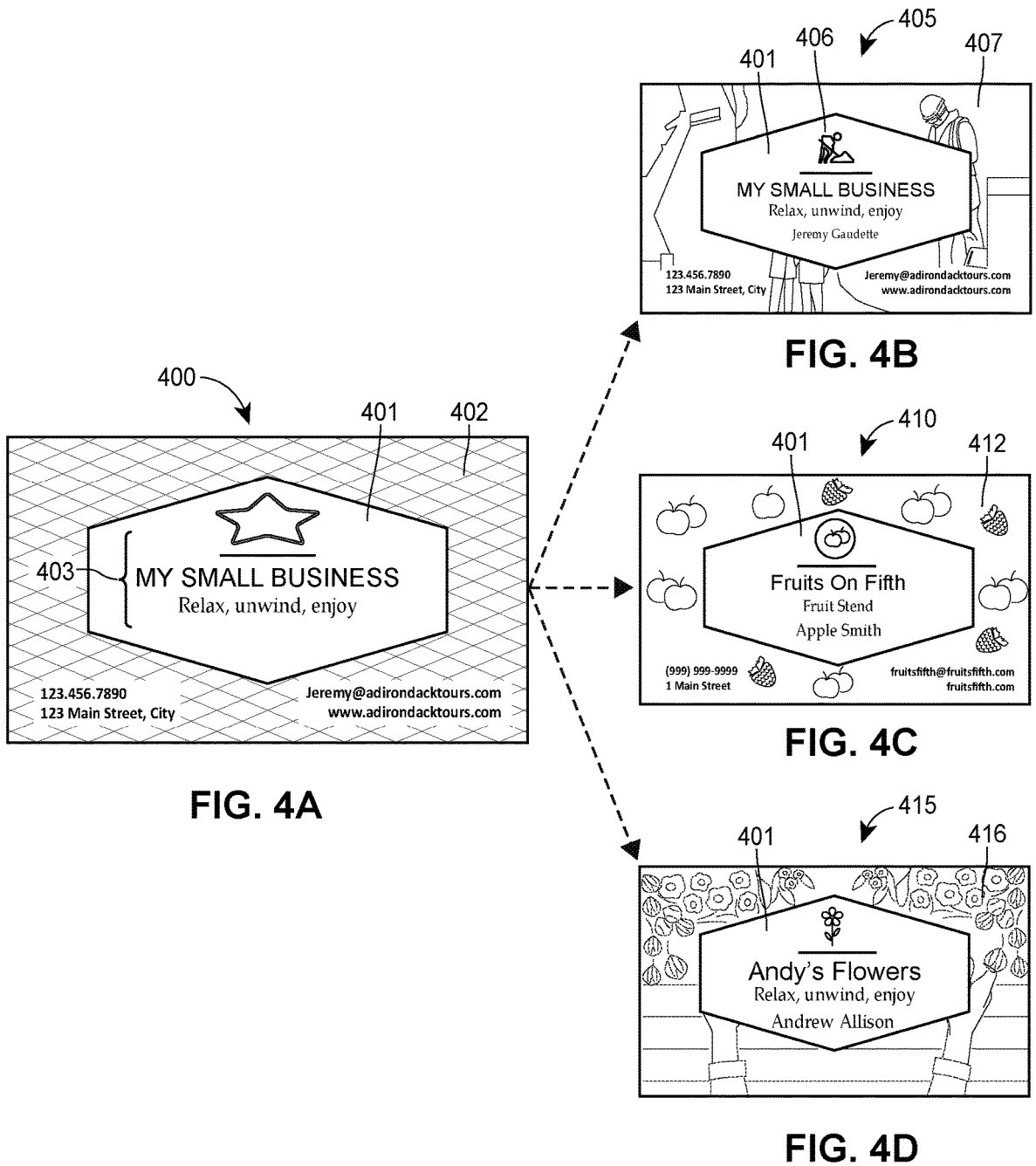
FIGS. 4A-4D depict an example template and product designs generated therefrom, in accordance with some embodiments.

FIG. 4A depicts a template 400 for a product design, where the template 400 includes a text field and a design element. In particular, a shape element 401 may be central to the template 400 and an image 402 may be a background image on which the shape element 401 is disposed. The template 400 may include a design element 403 contained within the shape element 401. In particular, as shown, the design element 403 includes a logo. A text field is also depicted in FIG. 4A, which stores textual content, such as a business name, a slogan, and a name of an individual located on the image 402. In embodiments, the shape element 401 may be various degrees of opacity.

Generally, a user may review the template 400 and explore generating a design based on the template 400. FIGS. 4B-4D each depict a design, in various stages of completion, based on the template 400 of FIG. 4A. For example, FIG. 4B depicts a design 405 based on the template 400 and having certain design elements. In particular, the design 405 has the same shape element 401 of the template 400, and includes an image 407 that replaces the image 402 of the template 400. Additionally, the design 405 includes a design element 406 of a logo that replaces the corresponding design element of the template 400.

In another example, FIG. 4C depicts an additional design 410 based on the template 400 and having certain design elements. As shown in FIG. 4C, the electronic device may receive an input string "Fruits on Fifth," and replace the default text field (e.g., "My Small Business") with the received input string on the user interface. The electronic device may interface with a data source to identify an entity (e.g., "Fruits on Fifth") based on the text field (e.g., "Fruits on Fifth") and subsequently retrieve an entity design element 411 (e.g., in image of a logo, text) associated with the entity from the data source. Examples of text associated with the entity include a name, a slogan, an address, a phone number, an e-mail address, or a website. Other entity design elements 411 may include a description of a category of the entity, such as "Fruit Stand" for the entity "Fruits on Fifth." The design 410 has the same shape element 401 of the template 400, and includes an image 412 that replaces the image 402 of the template 400. The image 412 may serve as the color scheme of the template.

FIG. 4D depicts an additional design 415 based on the template 400 having certain design elements. In particular, the design 415 has the same shape element 401 of the template 400, and includes an image 416 that replaces the image 402 of the template 400. Additionally, the design 410 includes entity design element 417 that replaces the corresponding design elements of the template 400.

Figure 5A:
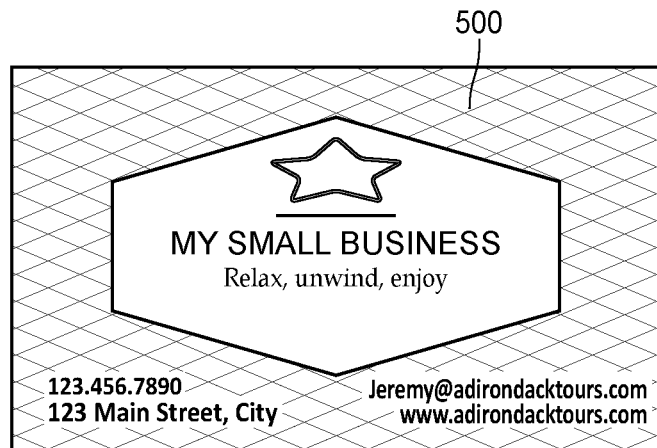
FIGS. 5A-5C depict an example template, example design elements, and an example product design generated from the example template, in accordance with some embodiments.
Figure 5B:
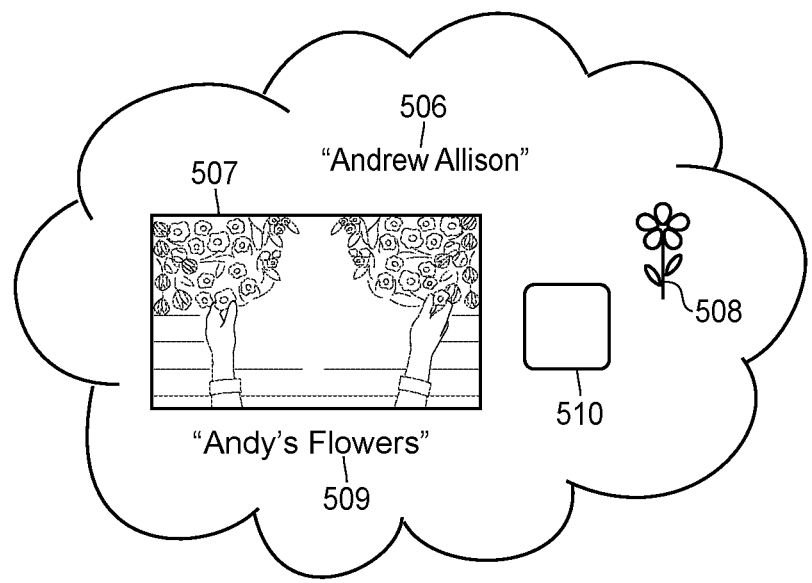
Figure 5C:
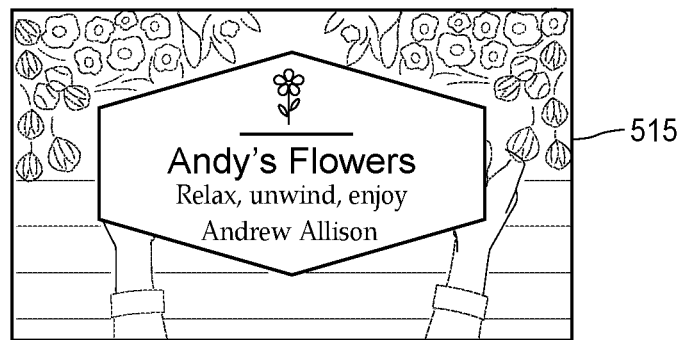

FIGS. 5A-5C depict example templates and/or designs for a product, and design elements thereof. It should be appreciated that the templates, designs, and design elements thereof are merely exemplary and that alternative and additional templates, designs, and design elements are envisioned.

FIG. 5A depicts a template 500 for a product design, where the template 500 includes a text field and a design element (as depicted, the template 500 is the same as the template 400 of FIG. 4A). A user may review the template 500 and explore generating a design based on the template 500. According to embodiments, the user may input a text string directed to desired elements for a product design. As discussed herein, the text string may be in the form of one or more terms, phrases, and/or the like. For example, the text string may be the terms "florist" and "flowers".

FIG. 5B is an illustration of various design elements 506-510 that may be desired for a product design based on the template 500. In embodiments, at least a portion of the design elements 506-510 may be a result(s) of the text string. For example, the design elements 507 and 508 may result from the text string terms "florist" and "flowers," where the design element 507 is an image of flowers and the design element 508 is a logo of a flower. Additionally, at least a portion of the design elements 506-510 may be input by a user or otherwise determined by an electronic device. For example, the design element 509 "Andy's Flowers" may correspond to a name of a business or entity and the design element 506 "Andrew Allison" may correspond to a name of an individual associated with the business. Moreover, at least a portion of the design elements 506-510 may be determined from another of the design elements 506-510. For example, the design element 510 may depict a dominant color of the image 507, which may be determined by the electronic device. FIG. 5C depicts a design 515 based on the template 500 and that incorporates the design elements 506-510 of FIG. 5B.

Figure 6A:
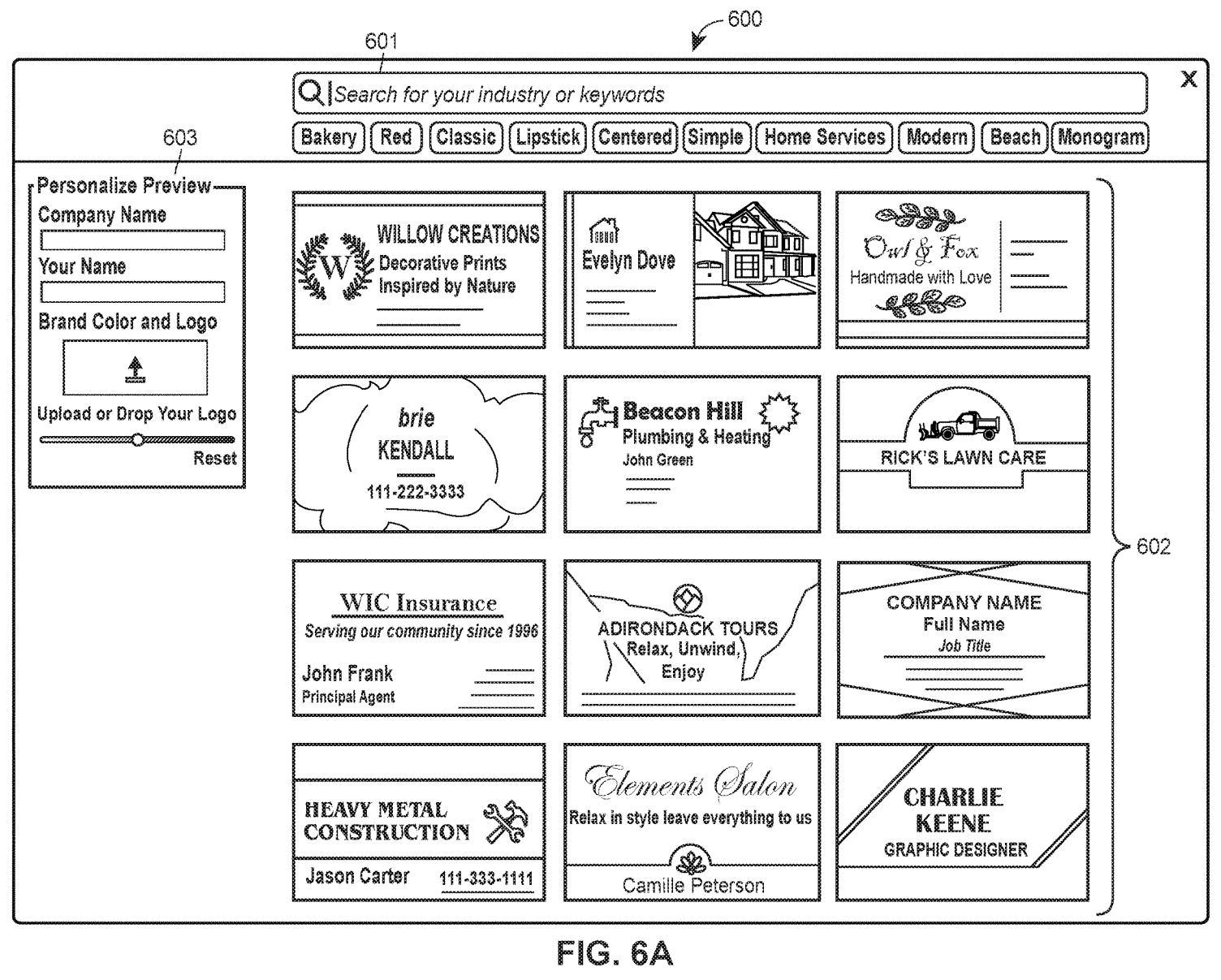
Figure 6B:
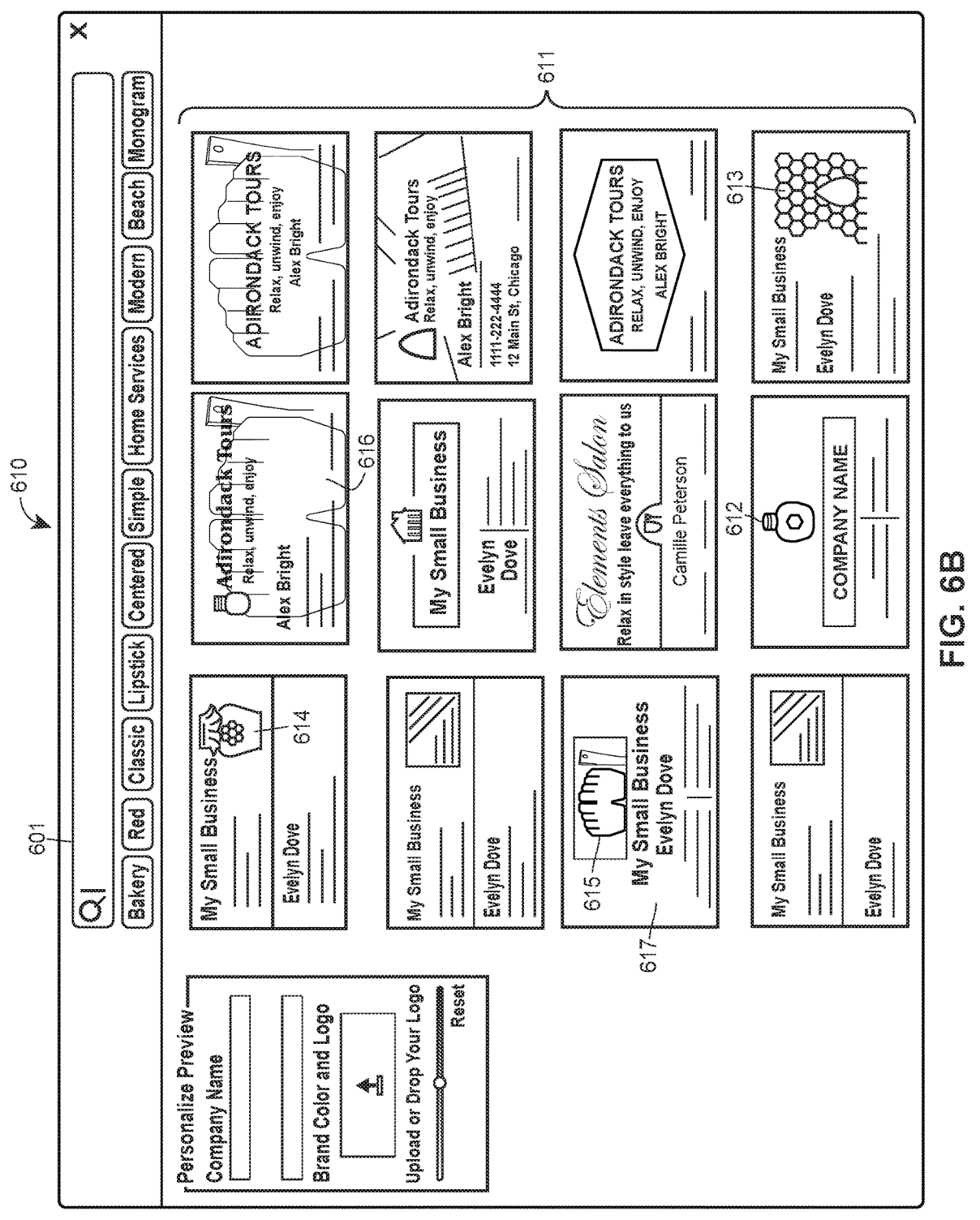
Figure 6C:
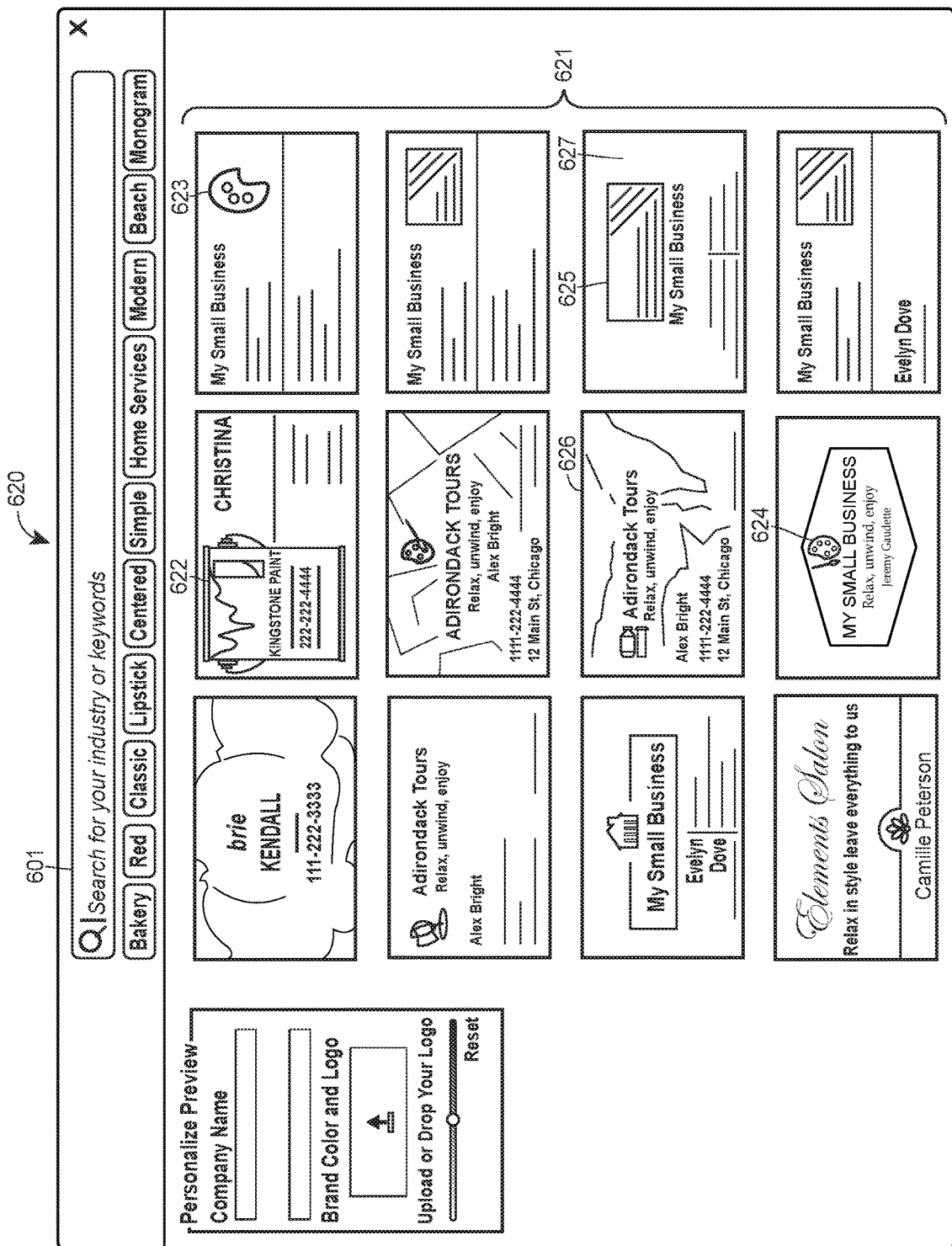

FIGS. 6A-6C and 7A-7D depict example user interfaces that may be displayed on an electronic device, such as the any of the electronic devices 103-105 as discussed with respect to FIG. 1A. In particular, FIGS. 6A-6C depict example functionalities related to automatically generating product designs using design elements identified from a search query (e.g., a text input string) for a search field, and FIGS. 7A-7D depict example functionalities related to automatically generating product designs using design elements linked to a particular entity.

FIG. 6A depicts an interface 600 that enables a user to input a search term(s) in association with automatically generating product designs. The interface 600 may include a search field 601 into or via which a user may input one or more search terms (e.g., textual input, speech-to-text input, etc.). Additionally, the interface 600 may display a gallery that includes a set of templates 602 that may be a default set or specific category of templates, where each of the templates 602 may include a text field(s) and a design element(s).

The interface 600 may further include an input box 603 into which the user may input information to personalize one or more of the templates 602. In particular, the input box 603 may enable the user to input a name for an entity (e.g., a company name), input a name of an individual (e.g., the name of a sales associate), select an image (e.g., a logo) to upload, and select a color for the product design(s).

FIG. 6B depicts an interface 610 after a search/query is performed in response to the user inputting a search term in the search field 601. In particular, the interface 610 depicts the term "beekeeping" input into the search field 601. The electronic device may facilitate the search based on the inputted term where, according to embodiments, there may be a set of images and a set of design elements that may be associated with "beekeeping." The electronic device may display, in the interface 610, a set of modified templates 611, where at least a portion of the set of modified templates 611 may include a portion of the set of images and a portion of the set of design elements associated with "beekeeping." For example, design elements 612, 613, and 614 are logos or motifs associated with beehives and/or honey. For further example, an image 615 may depict equipment used in beekeeping. In embodiments, the image 615 may be incorporated differently across different modified templates 611. For example, the image 615 may appear as a design element (in particular, a center image) in a modified template 617, and may appear as a background image in another modified template 616.

According to embodiments, the electronic device may additionally apply one or more colors to at least a portion of the set of modified templates 611. In particular, the electronic device may determine a dominant color(s) present in an image, and apply the dominant color(s) (e.g., as a hue(s)) to the image and/or to at least a portion of the design elements. For example, the electronic device may determine that the dominant color of the image 615 is yellow, and may apply a yellow hue to the image 615 (whether the image 615 appears as a design element or a background image), and/or to various of the design elements (e.g., one or more of 612, 613, 614).

FIG. 6C depicts an interface 620 after a search/query is performed in response to the user inputting a search term. In particular, the interface 620 depicts the term "paint" input into the search field 601. The electronic device may facilitate the search based on the inputted term where, according to embodiments, there may be a set of images and a set of design elements that may be associated with "paint." The electronic device may display, in the interface 620, a set of modified templates 621, where at least a portion of the set of modified templates 621 may include a portion of the set of images and a portion of the set of design elements associated with "paint." For example, design elements 622, 623, and 624 are logos or motifs associated with painting. For further example, an image 625 may depict a painting. In embodiments, the image 625 may be incorporated differently across different of the modified templates 621. For example, the image 625 may appear as a design element (in particular, a center image) in a modified template 627, and may appear as a background image in another modified template 626.

According to embodiments, the electronic device may additionally apply one or more colors to at least a portion of the set of modified templates 621. In particular, the electronic device may determine a dominant color(s) present in an image, and apply the dominant color(s) (e.g., as a hue(s)) to the image and/or to at least a portion of the design elements. For example, the electronic device may determine that the dominant color of the image 625 is blue, and may apply a blue hue to the image 625 (whether the image 625 appears as a design element or a background image), and/or to various of the design elements (e.g., one or more of 622, 623, 624).

Figure 7A:
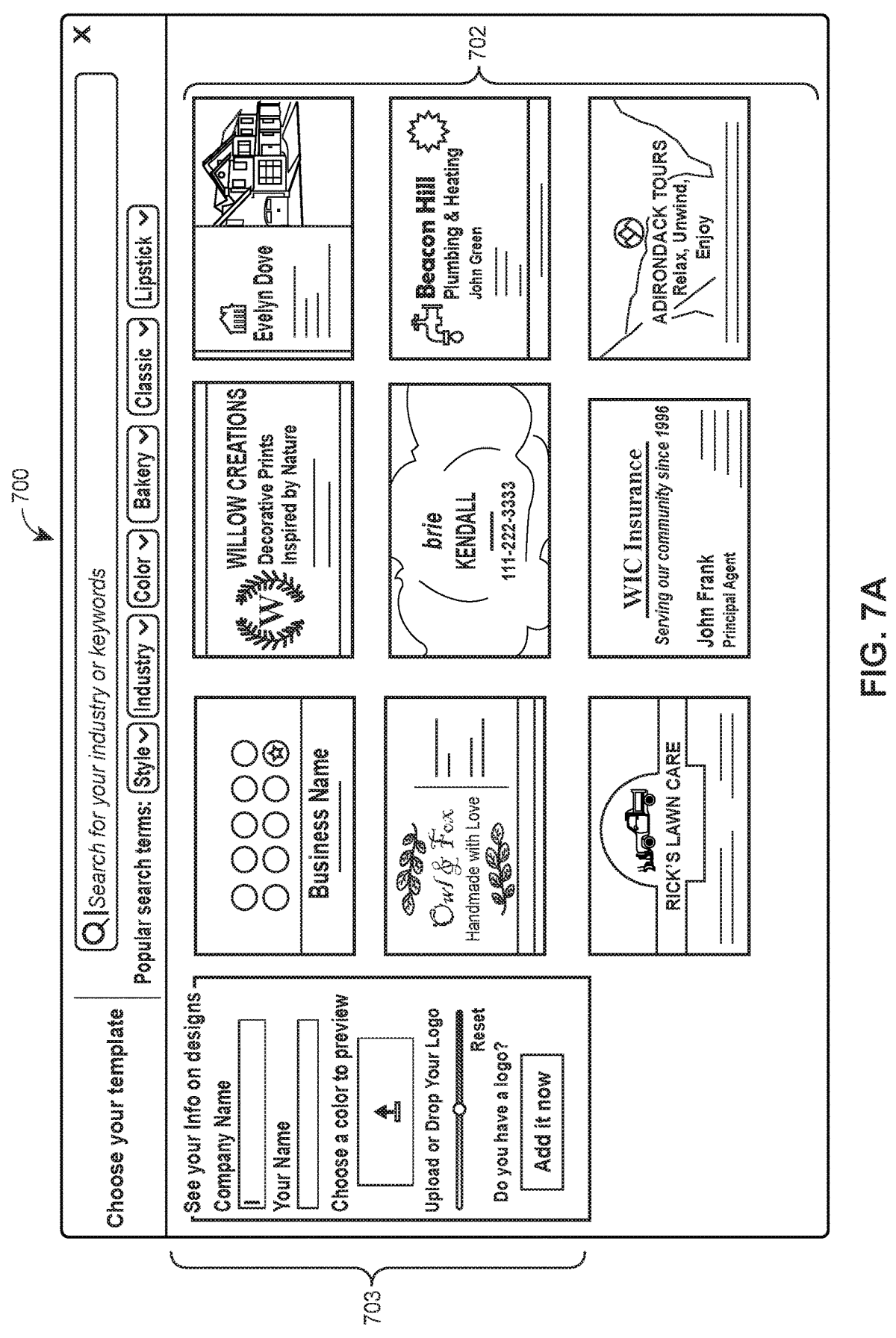

FIG. 7A depicts an interface 700 that enables a user to input a search term(s) or item(s) associated with an entity in association with automatically generating product designs. The interface 700 may include an input area 703 into or via which a user may input one or more search terms or items (e.g., textual input, speech-to-text input, etc.). In particular, the input area 703 may enable the user to input a name for an entity (e.g., a company name), input a name of an individual (e.g., the name of a sales associate), select a color for the product design(s), select an image (e.g., a logo) to upload, and select a color for the product design(s). Additionally, the interface 700 may include a set of templates 702 that may be a default set or specific category of templates, where each of the templates 702 may include a text field(s) and a design element(s).

Figure 7B:
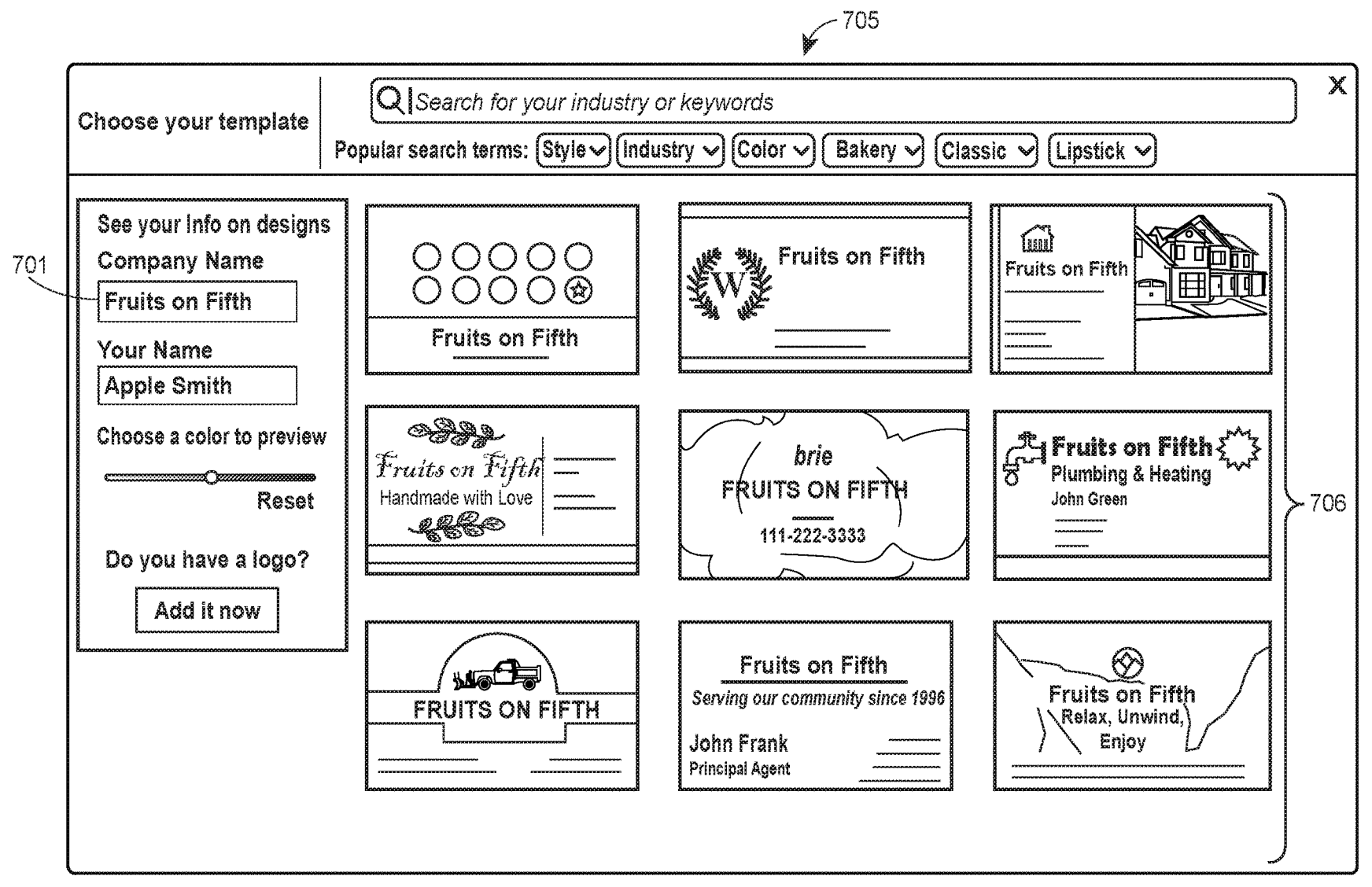

FIG. 7B depicts an interface 705 after a user inputs, into an input box 701, the string "fruits on fifth" that may correspond to an entity of the same name. In response to the user inputting the string into the input box 701, the electronic device may automatically modify the set of templates 702 depicted in FIG. 7A by adding the string "fruits on fifth" into the text field(s) included in each of the set of templates 702. Accordingly, the interface 705 may include a modified set of templates 706 that replace the business or company name in each of the set of templates 702 with "fruits on fifth."

Figure 7C:
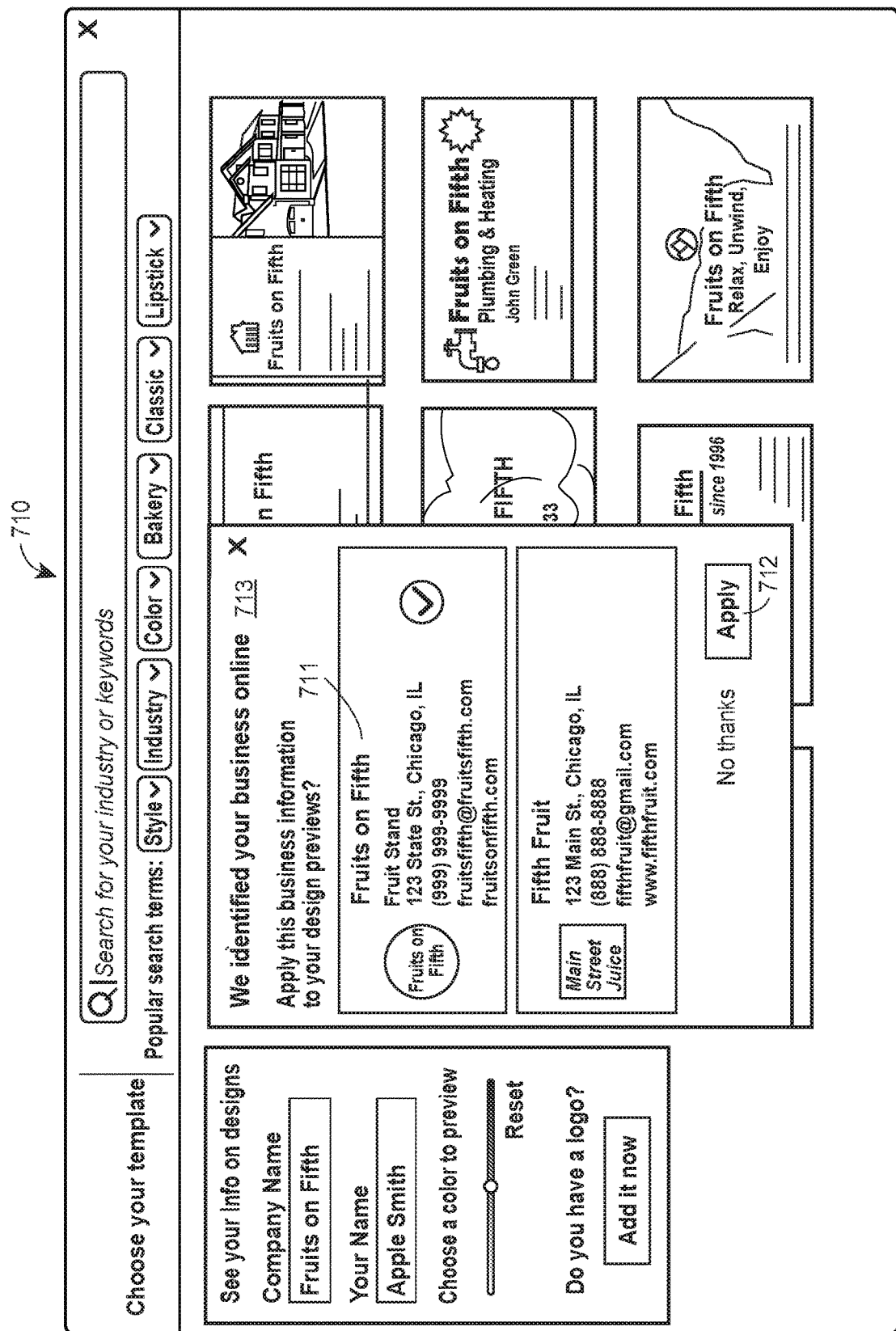

FIG. 7C depicts an interface 710 that the electronic device may display after the user inputs the string "fruits on fifth" into the input box 701 as depicted in FIG. 7B. According to embodiments, after the user inputs the string into the input box 701, the electronic device may facilitate a search by interfacing with a data source (e.g., a social networking service or device) to identify one or more entities that may match the inputted string or the filled text field(s) that reflect the inputted string. In some embodiments, the electronic device may interface with the data source by transmitting a request (or an update to the request) to the data source in real-time as a portion (or additional portions of the input string) are received in real-time, respectively. For instance, after the user inputs "fr" into the input box 701, the electronic device may transmit a request corresponding to "fr" to the data source, such that the data source may identify one or more entities that may match the inputted string "fr." After the user inputs "fru" into the input box 701, the electronic device may transmit an update to the request corresponding to "fru" to the data source, such that the data source may identify one or more entities that may match the inputted string "fru." In this way, some embodiments may facilitate a character-by-character search to identify an entity.

In response to transmitting the request (or the update to the request) and prior to identifying the entity, the electronic device may retrieve an interim entity design element in real-time from the data source. For instance, after the user inputs "fruit" into the input box 701, the electronic device may retrieve an interim entity design element representative of the entity "Rainier Fruit Company" and an entity design element representative of "Fruits on Fifth" in real-time from the data source, as both entity names include the characters "fruit." Upon completing the entry of "fruits on fifth," the electronic device may present the entity design element representative of "Fruits on Fifth" in real-time from the data source and hide those representative of "Rainier Fruit Company".

The interface 710 may include a pop-up window 713 that indicates the identified entities (as shown "Fruits on Fifth" and "Fifth Fruit"). According to embodiments, each of the identified entities may include a set of information, including a contact name and address, category (as shown: "Fruit Stand"), website, email address, and/or the like, and/or other content, including a logo and/or the like. In this example, the user may determine that "Fruits on Fifth" is the intended entity, and may accordingly select a selection 711 corresponding to this entity. The pop-up window 713 may also include an apply selection 712 that enables the user to select the intended entity. In embodiments, when the user selects the "apply" selection 712, the electronic device may retrieve, from the data source (e.g., a social networking service), various information and content, including an entity design element, associated with the selected entity. Accordingly, when the electronic device identifies a plurality of entities, the electronic device may prompt, via the user interface, a selection of a particular identified entity from the plurality of entities.

Figure 7D:
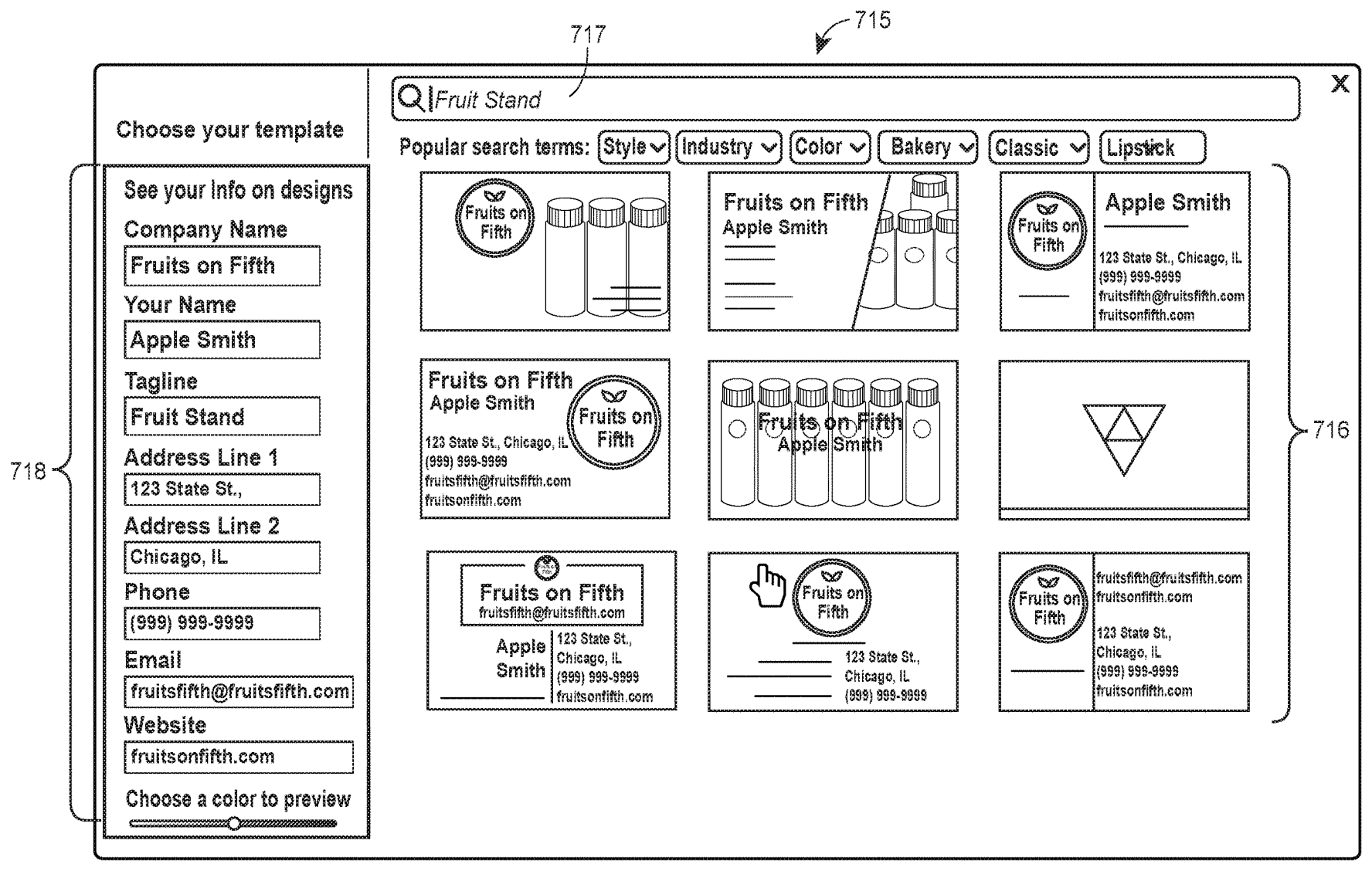

FIG. 7D depicts an interface 715 that the electronic device may display, for example, after the user selects the "apply" selection 712. As depicted in FIG. 7D, the interface 715 may indicate a set of information 718 associated with the selected entity "Fruits on Fifth," where the user may use the electronic device to modify or add to any of the set of information 718.

The interface 715 may further include a set of modified templates 716 that reflect the information and content associated with "Fruits on Fifth," where each of the set of modified templates 716 may include at least a portion of the information and content associated with "Fruits on Fifth." Generally, each of the set of modified templates 716 may include image(s), entity design element(s), and/or textual content that is associated with the selected entity (e.g., such as that retrieved from the data source). In some embodiments, at least a portion of the set of modified templates 716 may modify a corresponding portion of the set of templates 702 displayed in FIG. 7A. In other embodiments, the set of modified templates 716 may be different from the set of templates 702 displayed in FIG. 7A (i.e., the set of modified templates 716 may modify templates different from the set of templates 702, thus there being no overlap between the set of modified templates 716 and the set of templates 702).

In embodiments, the interface 715 may further include an input area 717, which may be populated by the user or may be populated automatically by the electronic device, for example from the information 711. As shown in FIG. 7D, the input area 717 includes the text "Fruit Stand"). In embodiments, the electronic device may facilitate a query based on the content included in the input area 717, either with the original data source or with another data source (e.g., a database accessible by a central server, such as the central server 110 as discussed with respect to FIG. 1A). The query may return a set of design elements, entity design elements, and/or images that may be associated with the inputted content, where the electronic device may initially or further modify the set of modified templates 716 based on the returned design elements, design elements, and/or images. Thus, any given template of the set of modified templates 716 may include information, images, design elements, design elements, and/or content retrieved from the original data source (e.g., the social networking service), information, images, design elements, design elements, and/or content retrieved from another data source, or a combination of both.

Additionally, the user may modify or add to any of the set of information 718. Accordingly, the electronic device may automatically and dynamically modify any of the set of modified templates 716 according to the modified and/or additional set of information 718. Thus, the user is able to review, in real-time, modifications to the product designs as reflected in the set of modified templates 716.

Figure 8:
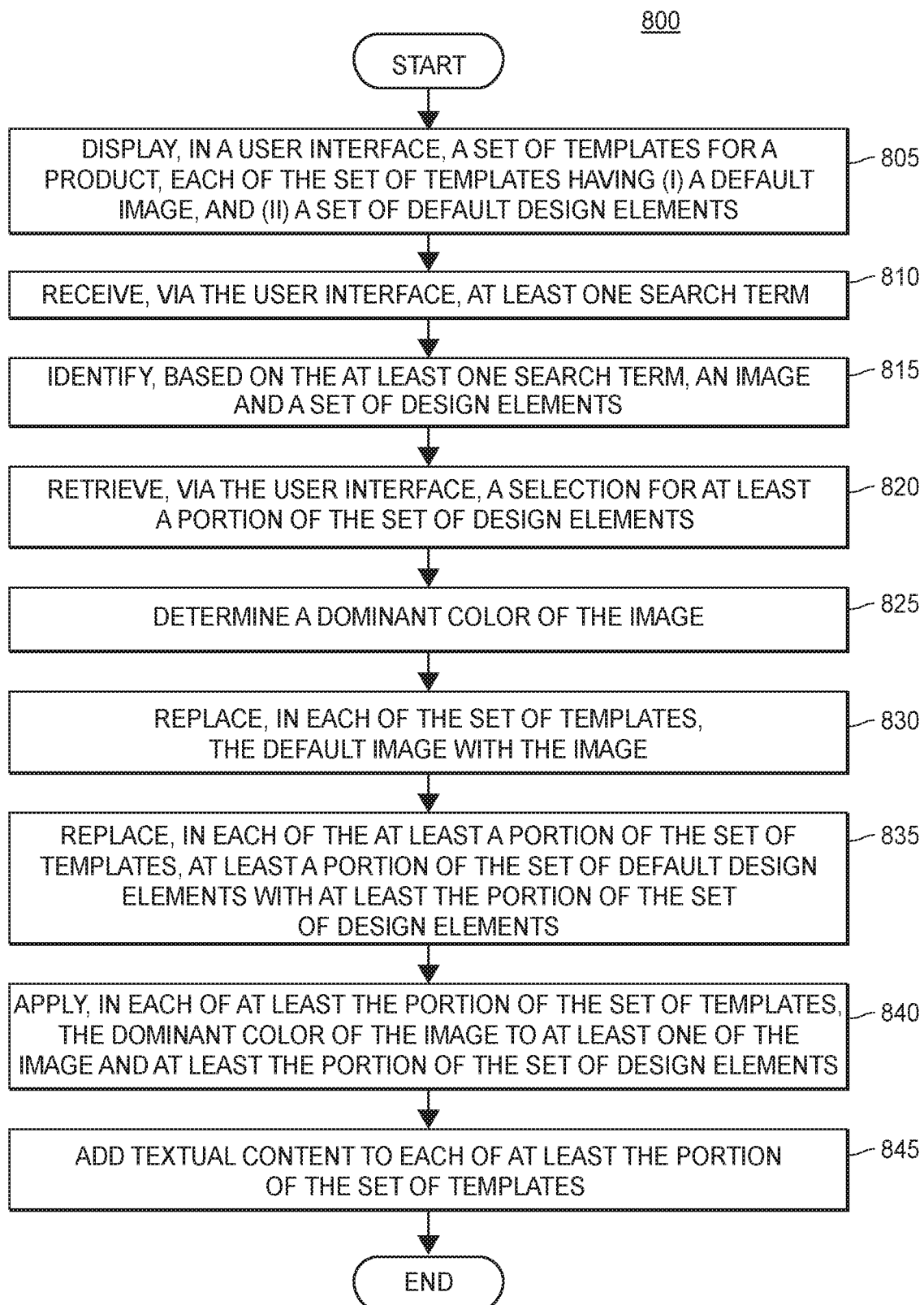
FIG. 8 depicts a block diagram of an example method for automatically generating designs for a product from a template, in accordance with some embodiments.

FIG. 8 depicts is a block diagram of an example method 800 for automatically generating designs for a product from a template. The method 800 may be facilitated by an electronic device (such as one of the electronic devices 103, 104, 105 as discussed with respect to FIG. 1A) that may be in communication with a server (such as the central server 110 as discussed with respect to FIG. 1A). In embodiments, the method 800 may be at least partially facilitated by a remote server, such as the central server 110 as discussed with respect to FIG. 1A.

The method 800 may begin when the electronic device displays (block 805), in a user interface, a set of templates for a product, where each of the set of templates has (i) a default image, and (ii) a set of default design elements. In embodiments, the set of templates, the default image(s), and the set(s) of default design elements may be default and/or may be selected by a user.

The electronic device may receive (block 810), via the user interface, at least one search term. In embodiments, the electronic device may receive the at least one search term via one or more data input channels. The electronic device may identify (block 815), based on the at least one search term, an image and a set of design elements. In embodiments, the electronic device may retrieve, from an image database based on the at least one search term, the image and the set of design elements. In additional or alternative embodiments, the electronic device may receive, via the user interface, a set of inputs indicative of the set of (or a portion of the set of) design elements.

The electronic device may receive (block 820), via the user interface, a selection for at least a portion of the set of design elements. In particular, the electronic device may display, in the user interface, the set of design elements, and the user may select which of the set of design elements to include in a product design. The electronic device may also determine (block 825) a dominant color of the image, or in some cases, multiple dominant colors.

The electronic device may also modify at least a portion of the set of templates. In particular, the electronic device may replace (block 830), in each of at least the portion of the set of templates, the default image with the image. Additionally or alternatively, the electronic device may replace (block 835), in each of at least the portion of the set of templates, at least a portion of the set of default design elements with at least the portion of the set of design elements. Additionally or alternatively, the electronic device may apply (block 840), in each of at least the portion of the set of templates, the dominant color of the image to at least one of the image and at least the portion of the set of design elements. The electronic device may present or display the modified set of templates for review by the user.

The electronic device may add (block 845) textual content to each of at least the portion of the set of templates. In embodiments, the electronic device may receive, via the user interface, textual content and add the textual content to each of at least the portion of the set of templates. The electronic device may perform certain analyses on the textual content. In particular, the electronic device may compare a contrast level of the textual content to a contrast level of the image with the dominant color applied thereto. Additionally, the electronic device may modify the textual content based on the comparing (e.g., bolding the textual content), and add the textual content that was modified to each of at least the portion of the set of templates.

Figure 9:
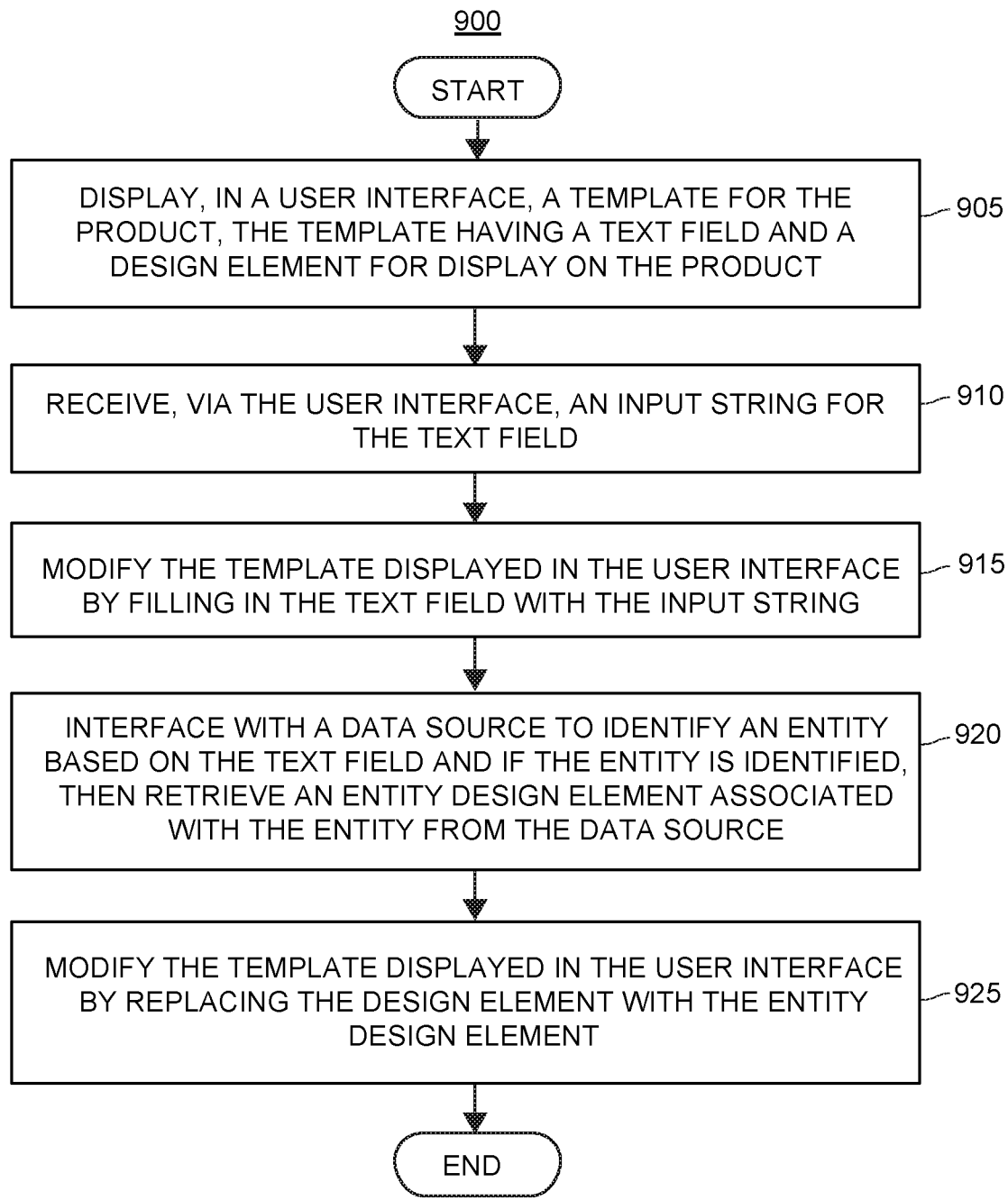
FIG. 9 depicts a block diagram of an example method for automatically generating designs for a product, in accordance with some embodiments.

FIG. 9 depicts is a block diagram of an example method 900 for automatically generating designs for a product. The method 900 may be facilitated by an electronic device (such as one of the electronic devices 103, 104, 105 as discussed with respect to FIG. 1A) that may be in communication with a server (such as the central server 110 as discussed with respect to FIG. 1A). In embodiments, the method 900 may be at least partially facilitated by a remote server, such as the central server 110 as discussed with respect to FIG. 1A.

The method 900 may begin when the electronic device displays (block 905), in a user interface, a template for a product, where the template has a text field and a design element. In embodiments, the template, text field, and the design element may be default and/or may be selected by a user.

The electronic device may receive (block 910), via the user interface, at least an input string for the text field. In embodiments, the electronic device may receive the input string via one or more data input channels. The electronic device may modify (block 915) the template displayed in the user interface by filling in the text field with the input string.

The electronic device may interface (block 920) with a data source to identify an entity based on the filled in text field, wherein the entity has an entity design element associated therewith. In embodiments, the electronic device may interface with a social networking service or device to identify the entity based on the filled in text field, wherein the entity has a profile with the social networking service or device, and wherein the entity design element is included as part of the profile.

In some embodiments, the electronic device may retrieve (i) a confirmation selection for the entity, and (ii) a set of selections corresponding to textual information. In particular, the electronic device may display, in the user interface, information associated with the entity, and receive, via the user interface, the confirmation selection for the entity. Additionally, the electronic device may display, in the user interface, the textual information associated with the entity (e.g., name(s), address, phone number, contact information, etc.), and receive, via the user interface, the set of selections corresponding to at least a portion of the textual information. In particular, a user may select certain of the textual information to include in the product designs, or add to or edit certain of the textual information.

The electronic device may replace (block 925), in the template, the design element with the entity design element. In embodiments, the electronic device may determine a category for the entity (e.g., "Fruit Stand"), and identify at least the entity design element based on the category.

Figure 10:
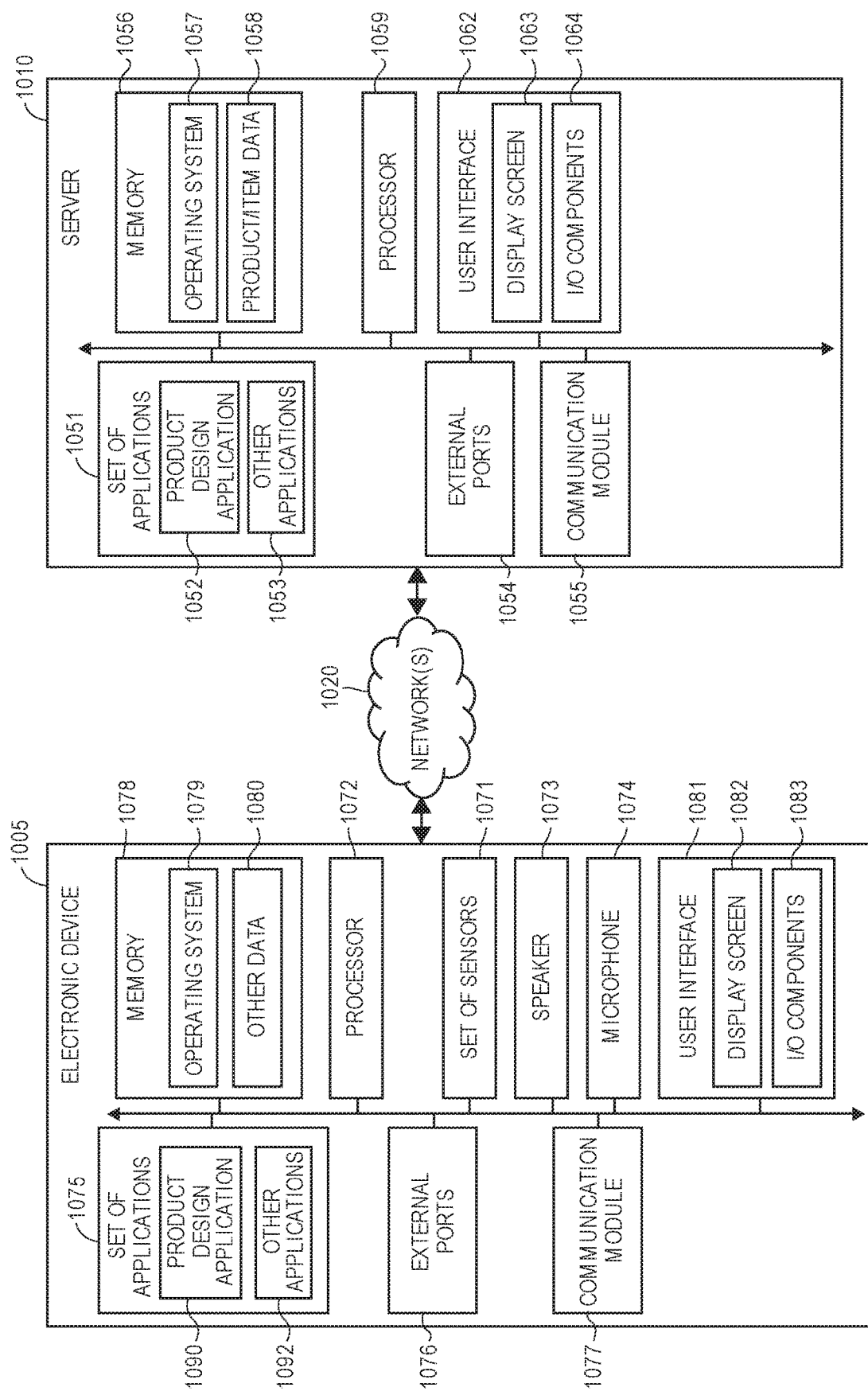
FIG. 10 is a block diagram of an example electronic device and an example server, in accordance with some embodiments.

FIG. 10 illustrates a hardware diagram of an example electronic device 1005 (such as one of the electronic devices 103-105 as discussed with respect to FIG. 1A) and an example server 1010 (such as the central server 110 as discussed with respect to FIG. 1A), in which the functionalities as discussed herein may be implemented.

The electronic device 1005 may include a processor 1072 as well as a memory 1078. The memory 1078 may store an operating system 1079 capable of facilitating the functionalities as discussed herein as well as a set of applications 1075 (i.e., machine readable instructions). For example, one of the set of applications 1075 may be a product design application 1090 configured to facilitate certain product designing functionalities as discussed herein. It should be appreciated that one or more other applications 1092, such as a web browser application, are envisioned.

The processor 1072 may interface with the memory 1078 to execute the operating system 1079 and the set of applications 1075. According to some embodiments, the memory 1078 may also store other data 1080 that may include data accessed or collected by various sensors. The memory 1078 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 1005 may further include a communication module 1077 configured to communicate data via one or more networks 1020. According to some embodiments, the communication module 1077 may include one or more transceivers (e.g., WWAN, WLAN, and/or WPAN transceivers) functioning in accordance with IEEE standards, 3GPP standards, or other standards, and configured to receive and transmit data via one or more external ports 1076.

The electronic device 1005 may include a set of sensors 1071 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 1005 may further include a user interface 1081 configured to present information to a user and/or receive inputs from the user. As shown in FIG. 10, the user interface 1081 may include a display screen 1082 and I/O components 1083 (e.g., ports, capacitive or resistive touch sensitive input panels, keys, buttons, lights, LEDs). According to some embodiments, the user may access the electronic device 1005 via the user interface 1081 to review information such product renderings, make design selections and modifications, and/or perform other functions. Additionally, the electronic device 1005 may include a speaker 1073 configured to output audio data and a microphone 1074 configured to detect audio.

In some embodiments, the electronic device 1005 may perform the functionalities as discussed herein as part of a "cloud" network or may otherwise communicate with other hardware or software components within the cloud to send, retrieve, or otherwise analyze data.

As illustrated in FIG. 10, the electronic device 1005 may communicate and interface with the server 1010 via the network(s) 1020. The server 1010 may include a processor 1059 as well as a memory 1056. The memory 1056 may store an operating system 1057 capable of facilitating the functionalities as discussed herein as well as a set of applications 1051 (i.e., machine readable instructions). For example, one of the set of applications 1051 may be a product design application 1052 configured to facilitate various of the product design functionalities discussed herein. It should be appreciated that one or more other applications 1053 are envisioned.

The processor 1059 may interface with the memory 1056 to execute the operating system 1057 and the set of applications 1051. According to some embodiments, the memory 1056 may also store product/item data 1058, such as data or information associated with products and items that may be offered for sale. The memory 1056 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 1010 may further include a communication module 1055 configured to communicate data via the one or more networks 1020. According to some embodiments, the communication module 1055 may include one or more transceivers (e.g., WWAN, WLAN, and/or WPAN transceivers) functioning in accordance with IEEE standards, 3GPP standards, or other standards, and configured to receive and transmit data via one or more external ports 1054. For example, the communication module 1055 may receive, from the electronic device 1005, requests for certain design elements.

The server 1010 may further include a user interface 1062 configured to present information to a user and/or receive inputs from the user. As shown in FIG. 10, the user interface 1062 may include a display screen 1063 and I/O components 1064 (e.g., ports, capacitive or resistive touch sensitive input panels, keys, buttons, lights, LEDs). According to some embodiments, the user may access the server 1010 via the user interface 1062 to review information, make changes, and/or perform other functions.

In some embodiments, the server 1010 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 1072, 1059 (e.g., working in connection with the respective operating systems 1079, 1057) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of automatically generating designs for a product, the method comprising:
    displaying, in a user interface, a template for the product, the template having a text field and a design element for display on the product;
    receiving, by a computer processor via the user interface, an input string for the text field;
    modifying, by the computer processor, the template displayed in the user interface by filling in the text field with the input string;
    interfacing with a data source to identify, by the computer processor, an entity based on the input string filled in the text field and when the entity is identified, then retrieving an entity design element associated with the entity from the data source; and
    modifying the template displayed in the user interface by replacing the design element with the entity design element.

2. The computer-implemented method of claim 1, wherein interfacing with the data source comprises:
    transmitting a request or an update to the request to the data source in real-time as a portion or additional portions of the input string are received in real-time, respectively; and
    in response to transmitting the request or the update to the request and prior to identifying the entity, retrieving an interim entity design element in real-time from the data source.

3. The computer-implemented method of claim 1, wherein the data source comprises a social media device.

4. The computer-implemented method of claim 1, wherein the design element comprises a second text field and wherein the entity design element comprises an entity text string, and
    wherein replacing the design element with the entity design element comprises filling in the second text field with the entity text string.

5. The computer-implemented method of claim 4, wherein the entity text string indicates at least one of a name, a slogan, an address, a phone number, an e-mail address, or a website associated with the entity.

6. The computer-implemented method of claim 1, further comprising:
    when the computer processor identifies a plurality of entities, prompting, via the user interface, a selection of a particular identified entity from the plurality of entities.

7. The computer-implemented method of claim 1, further comprising:
    receiving, by the computer processor via the user interface, a second input string for a search field,
    wherein displaying the template for the product is based on whether the template is associated with a category indicated by the second input string.

8. The computer-implemented method of claim 7, further comprising:
    displaying, in the user interface, a gallery comprising a plurality of templates, wherein displaying the plurality of templates is based on whether the plurality of templates is associated with the category indicated by the second input string, and
    modifying, by the computer processor, at least one of the plurality of templates displayed in the user interface by at least one of:
        filling in a text field of the at least one of the plurality of templates with the input string, or replacing a design element of the at least one of the plurality of templates with the entity design element.

9. The computer-implemented method of claim 1, wherein the entity design element comprises an entity color scheme, the method further comprising:
modifying a color scheme of the template in accordance with the entity color scheme.

10. A system for automatically generating designs for a product, the system comprising:
a user interface for displaying a template for the product, the template having a text field and a design element for display on the product;
a memory storing non-transitory computer executable instructions; and
a computer processor interfacing with the user interface and the memory,
wherein the computer processor is configured to execute the non-transitory computer executable instructions to:
receive an input string for the text field;
modify the template displayed in the user interface by filling in the text field with the input string;
interface with a data source to identify an entity based on the input string filled in the text field and when the entity is identified, retrieve an entity design element associated with the entity from the data source; and
modify the template displayed in the user interface by replacing the design element with the entity design element.

11. The system of claim 10, wherein the computer processor, upon execution of the non-transitory computer executable instructions, interfaces with the data source by:
transmitting a request or an update to the request to the data source in real-time as a portion or additional portions of the input string are received in real-time, respectively; and
in response to transmitting the request or the update to the request and prior to identifying the entity, retrieving an interim entity design element in real-time from the data source.

12. The system of claim 10, wherein the data source comprises a social media device.

13. The system of claim 10, wherein the design element comprises a second text field and wherein the entity design element comprises an entity text string,
wherein the computer processor, upon execution of the non-transitory computer executable instructions replaces the design element with the entity design element by filling in the second text field with the entity text string.

14. The system of claim 13, wherein the entity text string indicates at least one of a name, a slogan, an address, a phone number, an e-mail address, or a website associated with the entity.

15. The system of claim 10, wherein the computer processor, upon execution of the non-transitory computer executable instructions, is further configured to:
when the computer processor identifies a plurality of entities, prompt, via the user interface, a selection of a particular identified entity from the plurality of entities.

16. The system of claim 10, wherein the computer processor, upon execution of the non-transitory computer executable instructions, is further configured to:
receive, via the user interface, a second input string for a search field,
wherein displaying the template for the product is based on whether the template is associated with a category indicated by the second input string.

17. The system of claim 16, wherein the user interface is further configured to display a gallery comprising a plurality of templates based on whether the plurality of templates is associated with the category indicated by the second input string, and
wherein the computer processor, upon execution of the non-transitory computer executable instructions, is further configured to modify at least one of the plurality of templates displayed in the user interface by at least one of:
filling in a text field of the at least one of the plurality of templates with the input string, or
replacing a design element of the at least one of the plurality of templates with the entity design element.

18. The system of claim 10, wherein the entity design element comprises an entity color scheme,
wherein the computer processor, upon execution of the non-transitory computer executable instructions, is further configured to modify a color scheme of the template in accordance with the entity color scheme.

19. A non-transitory computer-readable storage medium configured to store instructions, the instructions when executed by a processor causing the processor to perform operations comprising:
displaying, in a user interface, a template for the product, the template having a text field and a design element for display on the product;
receiving via the user interface, an input string for the text field;
modifying the template displayed in the user interface by filling in the text field with the input string;
interfacing with a data source to identify an entity based on the input string filled in the text field and when the entity is identified, then retrieving an entity design element associated with the entity from the data source; and
modifying the template displayed in the user interface by replacing the design element with the entity design element.

20. The non-transitory computer-readable storage medium of claim 19, wherein interfacing with the data source comprises:
transmitting a request or an update to the request to the data source in real-time as a portion or additional portions of the input string are received in real-time, respectively; and
in response to transmitting the request or the update to the request and prior to identifying the entity, retrieving an interim entity design element in real-time from the data source.

* * * * *